US012121844B2

(12) United States Patent
Yehya et al.

(10) Patent No.: US 12,121,844 B2
(45) Date of Patent: Oct. 22, 2024

(54) SYSTEM AND METHOD FOR CONCENTRATING GAS

(71) Applicant: INVACARE CORPORATION, Elyria, OH (US)

(72) Inventors: Haneen Y. Yehya, Parma, OH (US); Alex P. Valentine, North Olmsted, OH (US); Michael J. Budinger, Fairview Park, OH (US); Kevin R. Starkey, North Ridgeville, OH (US)

(73) Assignee: Ventec Life Systems, Inc., Bothell, WA (US)

( * ) Notice: Subject to any disclaimer, the term of this patent is extended or adjusted under 35 U.S.C. 154(b) by 297 days.

(21) Appl. No.: 17/613,170

(22) PCT Filed: May 19, 2020

(86) PCT No.: PCT/US2020/033591
§ 371 (c)(1),
(2) Date: Nov. 22, 2021

(87) PCT Pub. No.: WO2020/242825
PCT Pub. Date: Dec. 3, 2020

(65) Prior Publication Data
US 2022/0305428 A1    Sep. 29, 2022

Related U.S. Application Data

(60) Provisional application No. 62/853,402, filed on May 28, 2019.

(51) Int. Cl.
*B01D 46/00* (2022.01)
*B01D 53/00* (2006.01)
(Continued)

(52) U.S. Cl.
CPC ......... *B01D 53/0407* (2013.01); *B01D 46/00* (2013.01); *B01D 53/00* (2013.01);
(Continued)

(58) Field of Classification Search
CPC ................................ B01D 46/00; B01D 53/00
See application file for complete search history.

(56) References Cited

U.S. PATENT DOCUMENTS

| | | | |
|---|---|---|---|
| 4,449,990 A | 5/1984 | Tedford, Jr. | |
| 5,906,672 A | 5/1999 | Michaels et al. | |

(Continued)

FOREIGN PATENT DOCUMENTS

| | | | |
|---|---|---|---|
| CN | 105402824 A | * | 3/2016 |
| JP | 2005111016 A | | 4/2005 |
| KR | 200378995 Y1 | * | 3/2005 |

OTHER PUBLICATIONS

International Search Report from PCT/US2020/033591 dated Oct. 26, 2020 (23 pages).

*Primary Examiner* — Robert A Hopkins
(74) *Attorney, Agent, or Firm* — Calfee, Halter & Griswold LLP

(57) ABSTRACT

Embodiments of gas concentrating systems and methods are provided. In one embodiment, the system includes, for example, a plurality of modules connectable and disconnectable from each other to thereby adjust the (gas) capacity and modality of the connected system. In this manner, a user need not maintain one system for on the go (ambulatory) scenarios and a wholly second system for stationary (e.g., at home) scenarios. The systems and methods further provide the ability to gradually upgrade the system capacity consistent with the user's lifestyle and medical needs.

20 Claims, 22 Drawing Sheets

(51) Int. Cl.
    *B01D 53/04*         (2006.01)
    *B01D 53/053*      (2006.01)
    *B01D 53/54*       (2006.01)

(52) U.S. Cl.
    CPC ........... *B01D 53/053* (2013.01); *B01D 53/54* (2013.01); *B01D 2256/12* (2013.01); *B01D 2257/102* (2013.01); *B01D 2259/4533* (2013.01); *B01D 2259/4541* (2013.01)

(56) References Cited

U.S. PATENT DOCUMENTS

| | | |
|---|---|---|
| 5,917,135 A | 6/1999 | Michaels et al. |
| 5,988,165 A | 11/1999 | Richey, II et al. |
| 7,294,170 B2 | 11/2007 | Richey, II et al. |
| 7,455,717 B2 | 11/2008 | Sprinkle |
| 7,722,700 B2 | 5/2010 | Sprinkle |
| 7,875,105 B2 | 1/2011 | Chambers et al. |
| 8,062,003 B2 | 11/2011 | Goertzen et al. |
| 8,070,853 B2 | 12/2011 | Sprinkle |
| 8,876,941 B1 | 11/2014 | Kornbluh et al. |
| 9,120,050 B2 | 9/2015 | Richey, II et al. |
| 9,266,053 B2 | 2/2016 | Shelnutt et al. |
| 2008/0257145 A1 | 10/2008 | Sprinkle et al. |
| 2010/0116270 A1 | 5/2010 | Edwards et al. |
| 2012/0055483 A1 | 3/2012 | Wilkinson et al. |
| 2018/0036460 A1 | 2/2018 | Bullock et al. |

\* cited by examiner

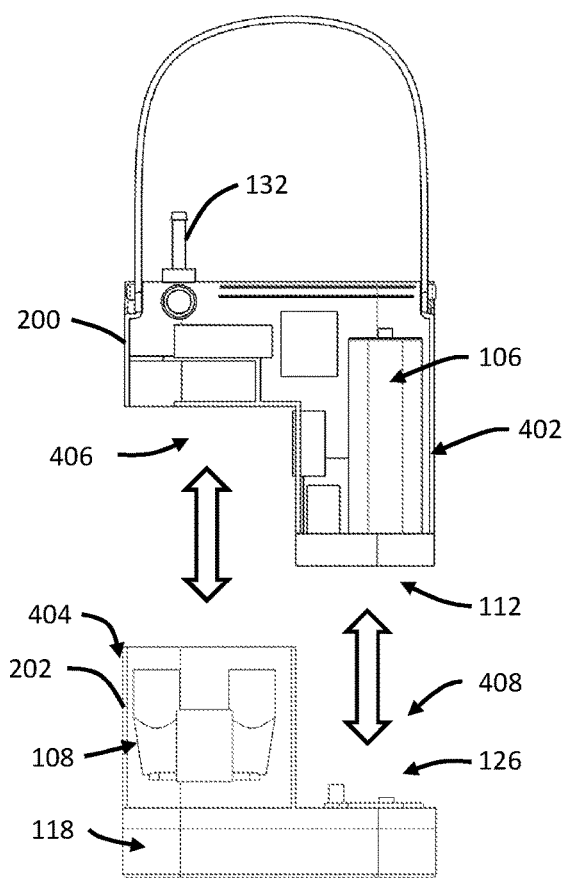
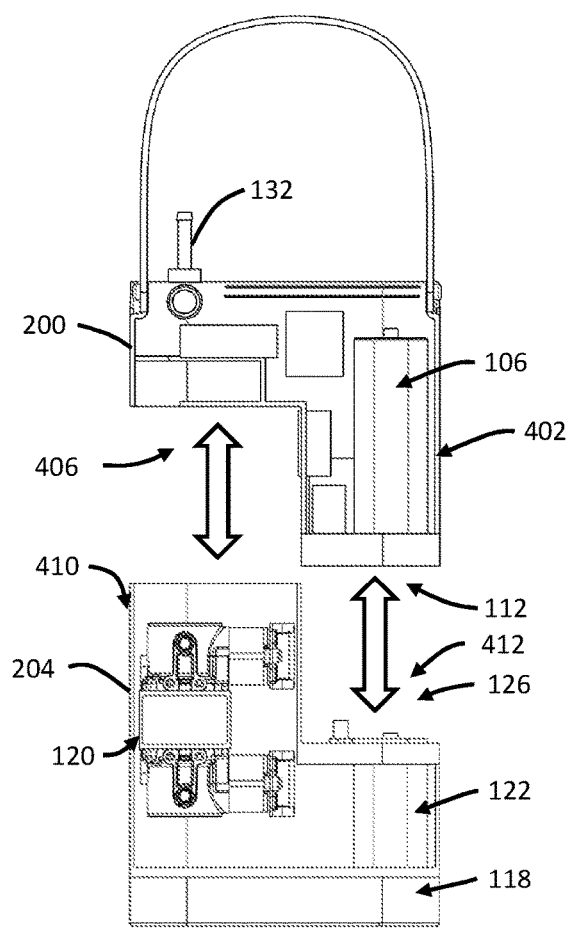
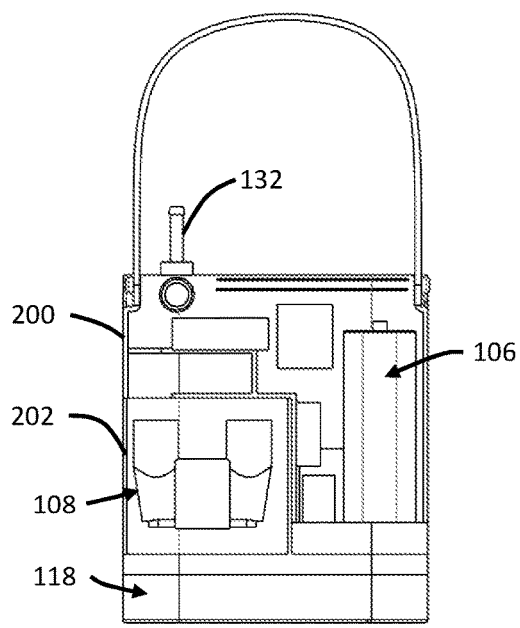
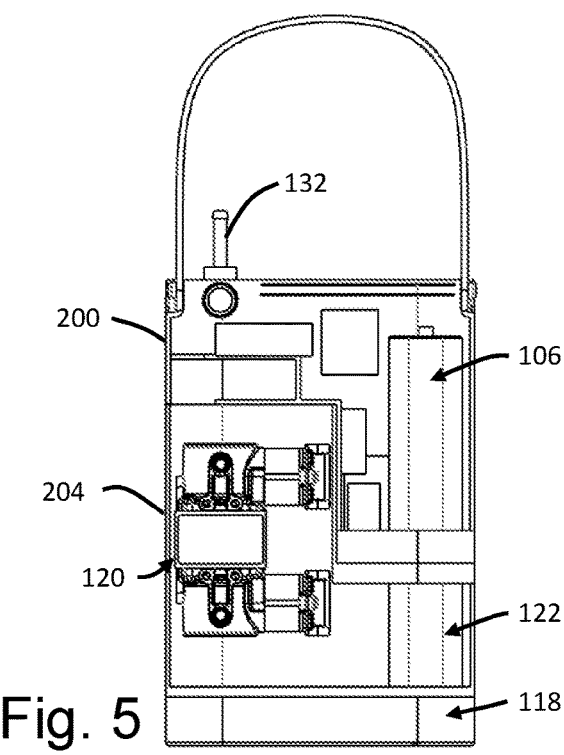
Fig. 4  Fig. 5

SYSTEM AND METHOD FOR CONCENTRATING GAS

RELATED APPLICATIONS

This application is the national stage entry of PCT/US2020/033592, filed on May 19, 2020, titled System and Method for Concentrating Gas, which claims priority to and all benefit of U.S. Provisional Patent Application Ser. No. 62/853,402, filed on May 28, 2019, titled System and Method for Concentrating Gas, and the entire disclosures of which are incorporated herein by reference.

BACKGROUND

Various applications exist for the separation of gaseous mixtures. For example, the separation of nitrogen from atmospheric air can provide a highly concentrated source of oxygen. These various applications include the provision of elevated concentrations of oxygen for medical patients and flight personnel. Hence, it is desirable to provide systems that separate gaseous mixtures to provide a concentrated product gas, such as a breathing gas with a concentration of oxygen.

Several existing product gas or oxygen concentrating systems and methods, for example, are disclosed in U.S. Pat. Nos. 4,449,990, 5,906,672, 5,917,135, 5,988,165, 7,294,170, 7,455,717, 7,722,700, 7,875,105, 8,062,003, 8,070,853, 9,266,053 and U.S. Pat. Publication No. 2008/0257145 which are commonly assigned to Invacare Corporation of Elyria, Ohio and fully incorporated herein by reference.

Such systems are known to be either stationary, transportable, or portable. Stationary systems are intended to remain in one location such as, for example, a user's bedroom or living room. Transportable systems are intended to be moved from location to location and often include wheels or other mechanisms to facilitate movement. Portable systems are intended to be carried with the user such as, for example, via a shoulder strap or similar accessory.

SUMMARY

Gas concentrating systems and methods are provided. In one embodiment, two or more modules can be connected together to form a complete system with the gas concentrating output being defined by the sum of the capacity of the modules. In another embodiment, two or more mini-systems can be connected together with their output being defined by the sum of the capacities of the mini-systems. In another embodiment, a control module having a user interface is re-usable with various capacity concentrated gas second modules. Other embodiments are also disclosed. In this manner, gas concentrating systems and methods providing multiple modalities including pulsed and/or continuous concentrated oxygen gas flows and various capacities can be provided to the user as needed by the user's everyday lifestyle and medical needs.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 4 and 5 illustrate another embodiment of a gas concentrating system.

DESCRIPTION

As described herein, when one or more components are described or shown as being connected, joined, affixed, coupled, attached, or otherwise interconnected, such interconnection may be direct as between the components or may be indirect such as through the use of one or more intermediary components. Also, as described herein, reference to a member, component, or portion shall not be limited to a single structural member, component, element, or portion but can include an assembly of components, members, elements, or portions.

Embodiments of the present invention provide, for example, the ability to change delivery modalities for a user based on their lifestyle or activity level. These modalities include both pulsed and continuous concentrated oxygen flows. For example, when a user is on the go (or ambulatory) the systems described herein can deliver portable (or transportable) concentrated oxygen that includes pulsed flows via a lightweight system. The lightweight system is not burdened with oversized or over-capacity components that add unnecessary weight and energy demands which hinder portability or transportability. When a user is not on the go (or not ambulatory) such as, for example, at rest at home, the systems described herein can be configured to deliver concentrated oxygen that includes continuous flows typically delivered via a higher capacity stationary-type system. In this manner, the embodiments described herein can integrate into a user's everyday life by providing a lightweight portable pulsed concentrated oxygen flow mode (for when on the go or ambulatory) and/or a stationary continuous concentrated oxygen flow mode (for when at rest or not ambulatory).

Users that are on the go (or ambulatory) are provided with a lightweight portable oxygen concentrating system that delivers oxygen via pulsed flow (or bolus). The provision of pulsed versus continuous flow allows a portable oxygen concentrating system to use smaller components that are lighter in weight and energy efficient. These characteristics enhance the portability of such lightweight systems. When users are not on the go, or at rest at home, portability, weight, and energy demands are not major concerns and thus the user may be provided with a continuous flow of concentrated oxygen via a stationary system. Stationary systems require higher capacity components to deliver continuous concentrated oxygen flow. The systems and methods of the present invention provide both modalities (i.e., pulsed and continuous flow) in a manner satisfying the lightweight demands of pulsed portable systems and the higher capacity (i.e., continuous) flow requirement of stationary systems. Embodiments of the present invention provide the change in modality via a modular architecture.

Figure 1A:
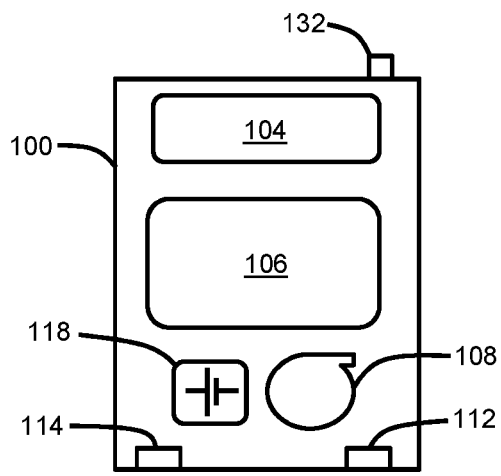
FIGS. 1A-1C show block diagrams of one embodiment of the gas concentrating system.
Figure 1B:
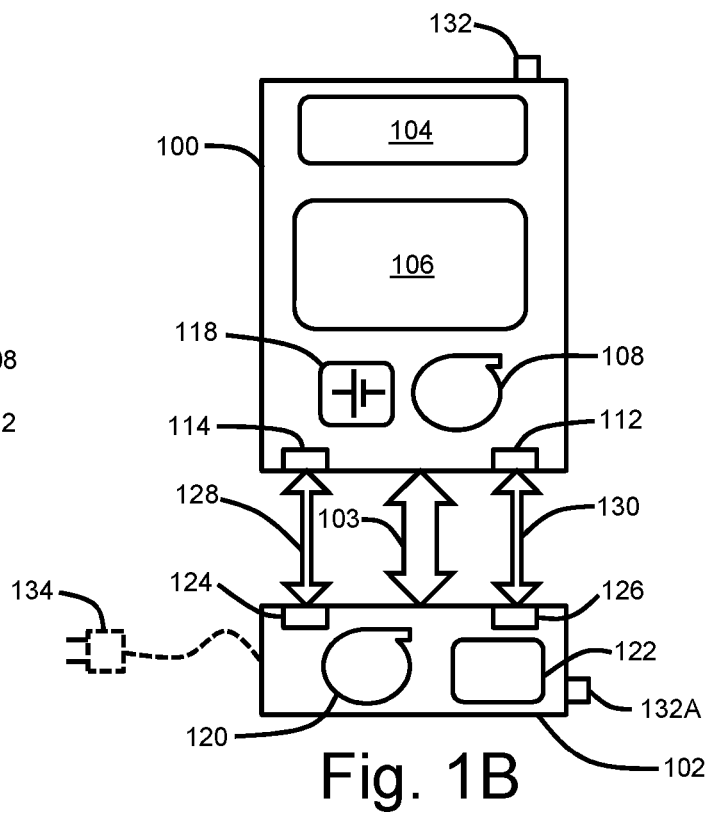

Embodiments include modules that can engage and disengage with other modules in order to change the operating characteristics or modality of the overall system. For example, FIGS. 1A and 1B illustrate a module (or head unit) 100 that can operate both with and without module (or base unit) 102. When head unit 100 is connected to base unit 102 as in FIG. 1B, the system provides operation akin to a stationary (or even a transportable) oxygen concentrating system. In this regard, stationary and transportable oxygen concentrating systems have the capacity and power to provide a continuous flow of concentrated oxygen gas to the user. When head unit 100 is disconnected or not used with base unit 102 as in FIG. 1A, head unit 100 provides operational and other characteristics (i.e., lightweight) akin to a portable oxygen concentrating system having the ability to provide a conserved or pulsed flow of concentrated oxygen gas to the user. Therefore, whether on the go (ambulatory) or not, the user's everyday needs and oxygen flow modalities are accommodated based on lifestyle and medical needs.

As shown in FIGS. 1A and 1B, one embodiment of head unit 100 includes the control system 104, the gas separation assembly 106, a pressure and/or vacuum pump 108, pneumatic port 112, electrical/data port 114, and power source (battery or fuel cell) 118. Control system 104 is typically a processor-based system with an analog and digital I/O system capable of operating the head unit 100 and base unit 102 (if connected) to provide a concentrated gas such as oxygen to a user. This includes, for example, controlling the operation of feed/inlet valves, output valves, pressure equalization valves, crossover valves, and pumps (vacuum and/or pressure). The system may be controlled in any one or more gas concentrating modes including pressure swing adsorption (PSA), vacuum swing adsorption (VSA), vacuum—pressure swing adsorption (VPSA) or other similar modes. The particular gas concentrating mode is not critical to the embodiments of the invention described herein so long as they are capable of producing a concentrated gas such as oxygen to the user. Examples of the above modes of operation are disclosed in, for example, U.S. Pat. Nos. 9,266,053 and 9,120,050 which are hereby fully incorporated by reference.

Gas separation assembly 106 typically includes, for example, two molecular sieve beds containing a nitrogen adsorbing material, various input, output, pressure equalization, and crossover valves, and at least one or two product tanks for holding the concentrated oxygen gas. In general, gas separation is achieved by flowing room air (which is typically 78% nitrogen and 21% oxygen) through the sieve beds. In the sieve beds, nitrogen gas molecules typically adhere to the sieve bed material thereby preventing the nitrogen molecules from exiting the sieve bed. The oxygen gas molecules typically do not adhere to the sieve bed material and can pass through the sieve beds and into one or more product tanks for collection and ultimate use by a user. Examples of sieve beds and product tanks can be found in U.S. Pat. No. 9,120,050 fully incorporated by reference. The particular configuration of the gas separation assembly 106 is not critical to the embodiments of the invention described herein so long as they are capable of producing a concentrated gas such as oxygen to the user. Hence, other examples and combinations of sieve beds, valves, and product tanks may also be used.

Pump 108 typically includes a vacuum and/or pressure pump. In one example, pump 108 is a light-weight, energy efficient, direct current (DC) based compressor or vacuum pump (including mounts and air filters). Such compressors and pumps come in piston or diaphragm configurations and are of various sizes, capacities and efficiencies. Pump 108 is configured to be powered by power source 118 for a time that includes up to several hours. Pump 108 capacity is preferably such that it can provide room air under vacuum or pressure to the gas separation assembly so at least a pulsed concentration (including varying pulsed concentrations) of gas can be provided to the user. In this embodiment, pump 108 is not oversized in order to maintain the lightweight characteristic of module or head unit 100. In other embodiments, a continuous flow of concentrated gas may be provided to the user if pump 108 has sufficient capacity. The particular configuration of pump 108 is not critical to the embodiments of the invention described herein so long as they are capable of working with the gas separation assembly 106 to provide a concentrated gas such as oxygen to the user.

Power source 118 is a rechargeable power source such as, for example, a battery or fuel cell, capable of providing enough energy to power head unit 100 for up to several hours of operation. Power source 118 may be internal or external to head unit 100 and physically removable and exchangeable by the user as necessary.

Pneumatic port 112 is used when module (or head unit) 100 connects to module (or base unit) 102 as shown in FIG. 1B. Pneumatic port 112 allows the transfer or movement of gas between head unit 100 and base unit 102. In one embodiment, pneumatic port 112 is at least one gasketed and normally closed gas port, but more than one can be provided. Upon head unit 100 connecting to base unit 102 (or before or after as well), pneumatic port 112 would change from being normally closed to be open thereby allowing gas movement 130 between the two units. The gasketing provides a sealing function to ensure substantially no gas leaks or escapes (e.g., see FIG. 11 showing gaskets/O-rings 1110 and 1114). Pneumatic port 112 can include, for example, a check valve or a normally closed solenoid valve and an optional filter. The particular arrangement of pneumatic port 112 (including the form of physical engagement with base unit 102) is not critical to the embodiments of the invention so long as it can provide at least substantially sealed transfer or movement of gas between head unit 100 and base unit 102 when the units are connected.

Electrical/data port 114 is also used when head unit 100 connects to base unit 102. Electrical/data port 114 allows for data and signals 128 to be transferred from head unit 100 to base unit 102 for control and feedback of system components. Examples include data and signal communications between the controller 104 in the head unit and the pump 106 controller in the base unit 102 to control pump 106 rotations per minute (RPM) and to provide feedback to the controller 104 for actual flow setting being provided to the patient via output 132. Electrical/data port 114 can be, for example, a physical port with metal contacts engaging with other metal contacts from electrical/data port 124 of the base unit 102. Electrical/data port 114 can also be virtual port such as, for example, a WIFI or Bluetooth data connection between head unit 100 and base unit 102. The particular arrangement of pneumatic port 114 (including the form of physical engagement with base unit 102) is not critical to the embodiments of the invention so long as data and signal communications can be provided between head unit 100 and base unit 102.

Referring to FIG. 1B, head unit 100 can connect to base unit 102 to provide, for example, the continuous flow of concentrated gas typical of a stationary or transportable oxygen concentrator. The connection between the head unit 100 and the base unit 102 is made by two modes: a guiding feature/assembly to align all connections (e.g., T-Channel, keyed form etc.) and a physical locking mechanism (e.g., spring loaded plunger, twist-to-lock mechanism, slide-to-lock mechanism etc.) to lock and unlock the connection. One or more of such guiding features and physical locking mechanism can be used to connect and disconnect the head unit 100 to base unit 102. Both the guiding and locking features/assemblies can, for example, be combined into a single structure or assembly as well and not be separate assemblies. The particular guiding feature and locking mechanism is not critical to the embodiments of the invention so long they provide reliable connection, disconnection, locking and unlocking of the head unit 100 to and from the base unit 102.

In one embodiment, base unit 102 includes, for example, pump 120 and a gas separation assembly 122. Pump 120 can be any suitable compressor or vacuum pump capable of providing a flow of air or gas through gas separation assemblies 122 and 106 (in the head unit 100). This includes an alternating current (AC) or direct-current (DC) pump. In one example, pump 120 has a larger capacity for causing airflow compared to pump 108 in the head unit 100. This larger capacity for airflow allows base unit 102 to provide the overall system with additional gas separation capacity via assembly 122 so the overall system can provide a continuous flow of concentrated oxygen gas to a user. In another embodiment, pumps 108 and 120 can have the same or similar capacity and be operated jointly (or in parallel) to provide an increased airflow to the gas separation assemblies thereby providing a continuous flow of concentrated oxygen gas to a user.

Gas separation assembly 122 is similarly arranged to gas separation assembly 106 so that the combination provides a larger molecular sieve structure than gas separation assembly 106 alone. In one embodiment, gas separation assemblies 122 and 106 when connected together provide a stacked arrangement of molecular sieve beds through pneumatic ports 112 and 126. This stacked or connected arrangement of gas separation assemblies provides the overall system with greater gas separation (and thus gas concentration) capability than by the head unit 100 alone. To provide this additional capacity, pneumatic port 126 in base unit 102 is similarly arranged and mates to pneumatic port 112 and allows gas flow from the base unit 102 to head unit 100. In this embodiment, the gas flow is between the stacked or connected gas separation assemblies 122 and 106.

Base unit 102 can be configured to be powered from various energy sources including a wall outlet providing AC electricity. Base unit 102 can further include the necessary electronics for converting AC electricity to DC electricity and to provide power for head unit 100 including recharging of power source 118 therein through data/electrical port 124. Data/electrical port 124 is similarly arranged and mates to data/electrical port 114 in head unit 100 to allow data and electrical signals 128 to be communicated between the units.

Data/electrical ports 114 (and 124) are monitored by controller 104 to determine when base unit 102 has been connected to head unit 100. Upon connection (which can also be detected by a mechanical switch), control unit 104 communicates with pump controller 120 in base unit 102 to operate the overall system to take advantage of the extra capacity provided by base unit 102. This can be accomplished by controller 104 sensing the presence of an electrical signal or particular data present on data/electrical port 114. Other arrangements for determining connection to base unit 102 may also be provided and are not critical to the invention.

Base unit 102 may also include its own, or a second, patient output 132A. Patient output 132A is similarly connected as patient output 132 to the gas separation assemblies and control module to provide concentrate oxygen to a patient. One advantage of having a second patient output port, such as on base unit 102, is that the user need not have to disconnect the cannula connected to output 132 and connect it to output 132A when base unit 102 is used. Also, the user can maintain a short cannula connected to the head unit's patient output 132 (used for when being on to go or ambulatory) and maintain a longer cannular connected to the base unit's patient output port 132A when stationary-type operation is provided such as in the home.

Figure 1C:
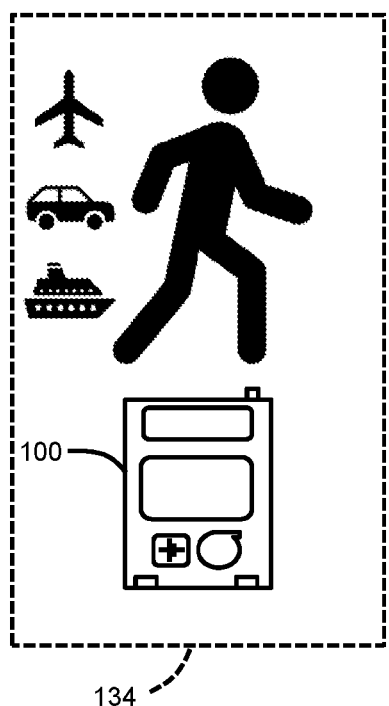
Figure 1C:
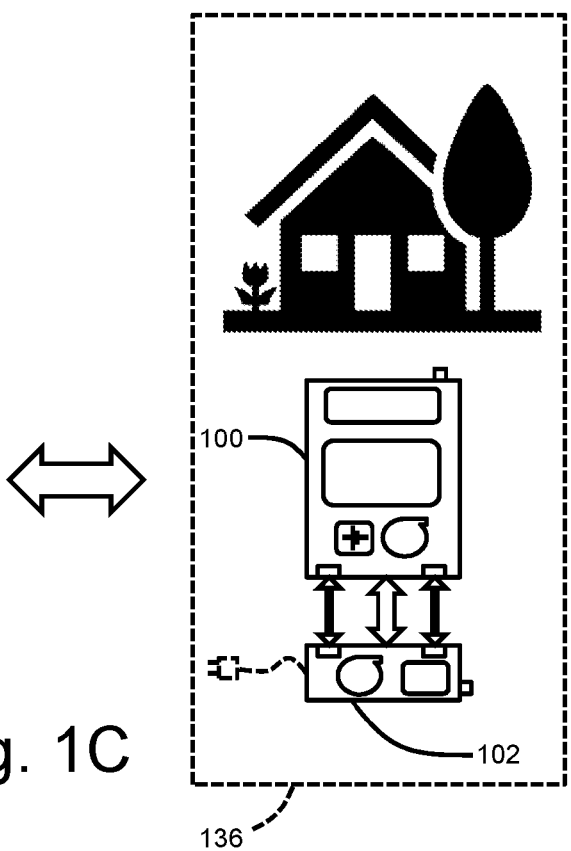

Base unit 102 and hence the overall system including head unit 100 may be stationary, portable (transportable) and/or mobile allowing for integration into a user's everyday life activities and medical oxygen needs. In the stationary configuration (see e.g., FIGS. 1B and 1C), base unit 102 can take advantage of an AC power source such as a wall outlet to provide a continuous flow (or modality) of concentrated gas. In the portable or transportable configuration, base unit 102 can further include a power source 118/134 such as a battery or fuel-cell to provide power to pump 120 and other components during transport or mobility. To facilitate transportability, base unit 102 may include two or more wheels and a handle that maybe telescoping from the base unit 102 or head unit 100. Other arrangements for transporting or mobility can include a carrying bag and shoulder strap. Hence, as shown in FIG. 1C, head unit 100 may be used for on the go (i.e., ambulatory) modalities 134 including, for example, travel by airplane, car, or ship. When a stationary modality 136 is desired, base unit 102 may be connected to head unit 100 for additional system capacity.

Figure 2A:
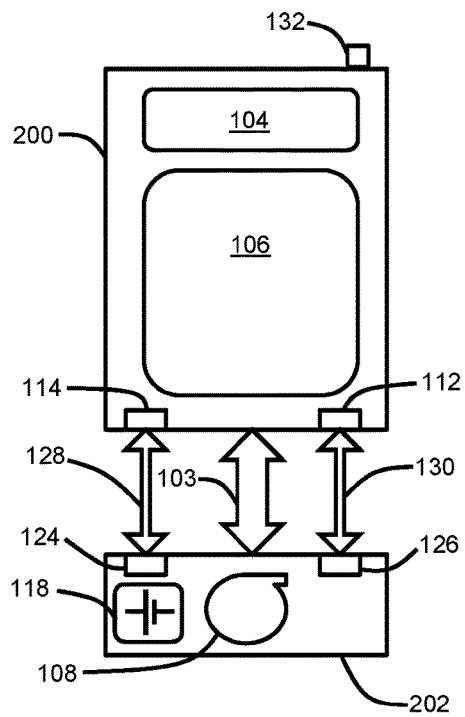
FIGS. 2A-2C show block diagrams of a second embodiment of a gas concentrating system.
Figure 2B:
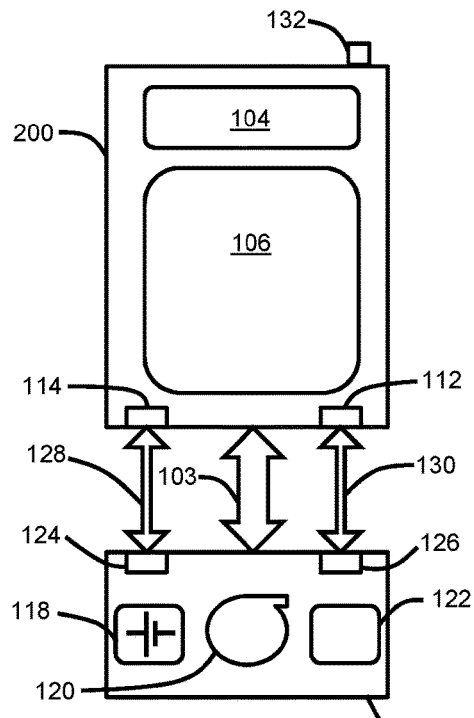

FIGS. 2A and 2B illustrate another embodiment of a gas concentrating system that includes a module or head unit 200 configured to be connected to one of a plurality of base or pump modules 202 and 204. In one embodiment, head unit 200 is similarly arranged to head unit 100 of FIGS. 1A and 1B, except for the power source and pump. This arrangement allows the user to configure an oxygen concentrating system based on need, e.g., a pulsed flow of concentrated oxygen gas or a continuous flow concentrated oxygen gas. To accomplish this arrangement, the power source and various pumps are contained within exchangeable modules 202 and 204. Modules 202 and 204 are similarly arranged as base unit 102 (FIGS. 1A and 1B) and can be connected and disconnected from head unit 200.

In the embodiment shown in FIG. 2A, module 202 includes power source 118 and pump 108 that is lightweight, energy efficient and configured to allow the overall system to provide a plurality of pulsed doses of concentrated oxygen gas. As described above, a conserver device within head unit 200 can release a varying size pulse (or bolus) of concentrated oxygen gas from a product tank to the user upon inhalation. By delivering a pulsed dose of concentrated oxygen gas, a smaller lightweight capacity pump 108 can be used and the energy of power source 118 extended.

In the embodiment shown in FIG. 2B, a second module 204 is illustrated. Module 204 is similar to module 202 and includes a higher capacity pump 120 and additional gas separation assembly 122. By providing head unit 200 with connection to a higher capacity pump 120 and additional gas separation assembly 122, the system can provide a continuous flow of concentrated oxygen gas to the user as previously described in connection with FIGS. 1A and 1B. Power source 118 associated with module 204 may also be of increase capacity to provide for extended operation of higher capacity pump 120. Modules 202 and 204 may further include electronics for recharging power source 118 via an external source.

In yet another embodiment, module 202 may further connect to module 204 to provide the added capacity of more than one pump (i.e., pumps 108 and 120). In this embodiment, the system would include head unit 200 connected to a first module (e.g., 202), which is then connected to a second module (e.g., 204). Either or both modules 202 and 204 would include additional physical guiding and locking mechanisms, and data/electrical ports and pneumatic ports similar to ports 112, 114, 124, and 126.

Figure 2C:
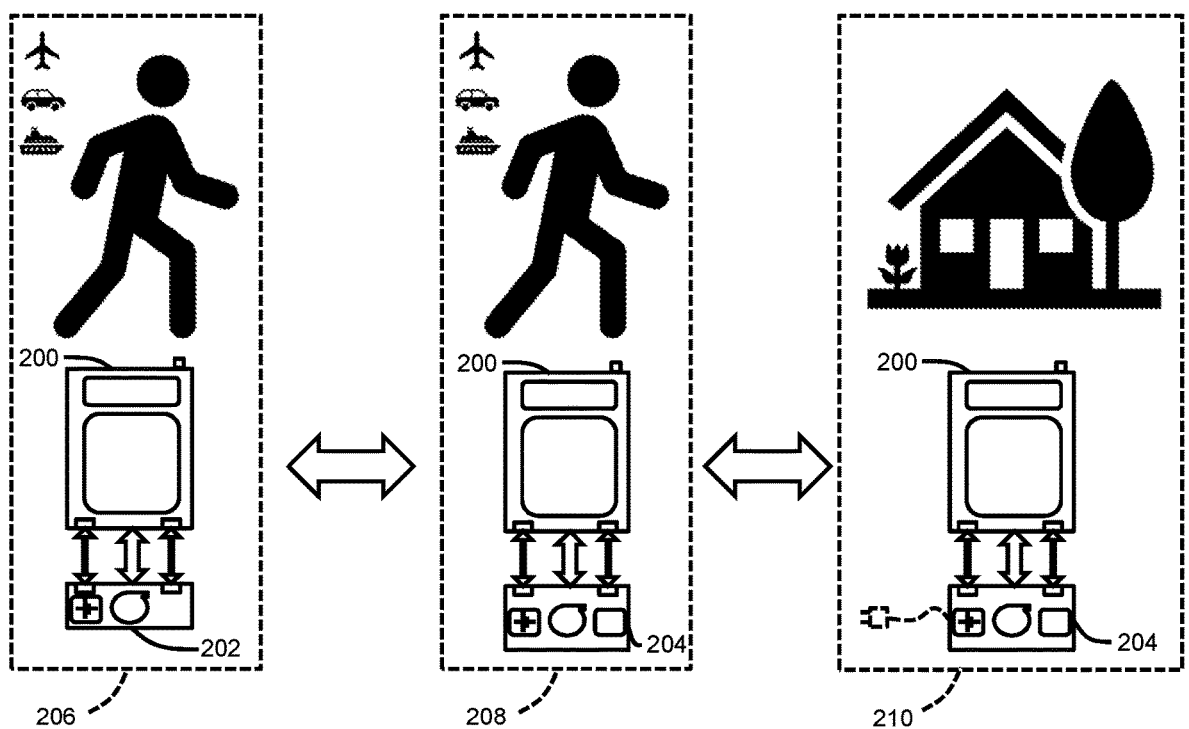

Thus, in connecting head unit 200 to one or more of modules 202 and 204, a modular or configurable oxygen concentrating system can be provided allowing for multiple modes of operation (e.g., pulsed or continuous oxygen flow). This eliminates the need for a user to have one stationary system for providing continuous oxygen flow (see modality 210 in FIG. 2C) and another transportable or mobile system for providing pulsed oxygen flow when being mobile inside or outside the home (see modalities 206 and 208 in FIG. 2C). Users can take advantage of the common head unit 100/200 hardware and appropriately connect the desired base unit 102 or modules 202/204 to obtain the flow of concentrated oxygen gas needed under the circumstances (e.g., the user's lifestyle and medical needs and shown in FIG. 2C).

Figure 3:
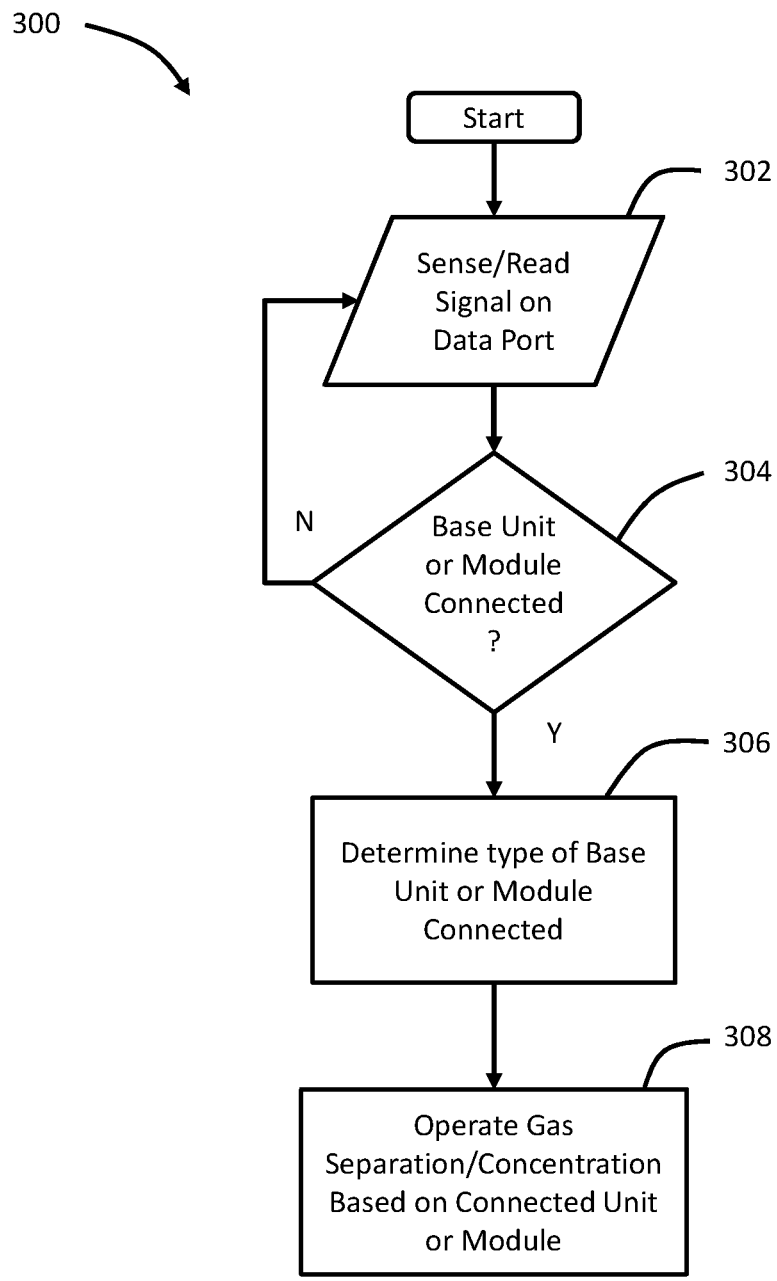
FIG. 3 is one example of a logic flow diagram for a gas concentrating system.

Referring now to FIG. 3, one embodiment of a flow chart 300 for a gas concentrating system is illustrated. The rectangular elements denote processing blocks and represent computer software instructions or groups of instructions. The diamond elements represent decision processing blocks and computer software instructions or groups of instructions. The flow diagram(s) shown and described herein do not depict syntax of any particular programming language. Rather, the flow diagram(s) illustrate the functional information that may be used to fabricate circuits or computer software to perform the processing of the system. It should be noted that many routine program elements, such as initialization of loops and variables and the use of temporary variables are not shown. Furthermore, the exact order of the process steps need not necessarily be performed in the order shown or described herein and may be modified to exclude certain steps.

In block 302, the control unit reads or senses for a module identification signal or data on data port 114. The module identification signal can be, for example, data including module identification or simply the presence of a signal (e.g., a 5 V signal) on a particular electrical line of the data port 114. The particular form of the signal is not critical as long as it allows the control unit to identify the connection of a module (or base unit). In block 304, the control unit loops back to block 302 until it senses the connection of a module or base unit. If the base unit or module is connected, the logic proceeds to block 306 where the control unit determines the type of base unit or module connected. The type of base unit or module connected can be determined from the type of signal or data that is on the module identification signal. For example, the module identification signal can contain multiple types of data for indicating which type of module or base unit is connected. Similarly, various analog signals can also be used to determine which type of module or base unit is connected. In block 308, the control unit begins operation of the system based on the parameters belonging to the type of module or base unit connected to the head unit.

For example, if the control unit determines that a module having a small capacity pump/compressor (e.g., a first pump/compressor type) for mobile use is connected to the head unit, the control unit will set the system operating parameters to be consistent with the relatively small capacity pump/compressor and to provide various pulsed doses of concentrated oxygen gas to a user through a controlled conserver device. If the control unit determines that a module having a larger capacity pump/compressor (e.g., a second pump/compressor type) for stationary or transportable use is connected to the head unit, the control unit will set the system operating parameters to be consistent with the relatively large capacity pump/compressor and to provide various continuous or pulsed flows of concentrated oxygen gas to a user. These various system operating parameters can be stored in an internal or removable memory of the control unit.

The control or flow logic shown and described herein preferably resides in or on a computer readable medium such as, for example, a Read-Only Memory (ROM), Random-Access Memory (RAM), programmable read-only memory (PROM), electrically programmable read-only memory (EPROM), electrically erasable programmable read-only memory (EEPROM), magnetic disk or tape, and optically readable mediums including CD-ROM and DVD-ROM. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

Referring to FIGS. 4 and 5, embodiments of physical form factors for head unit 200 and modules 202 and 204 are illustrated. FIG. 4 shows head unit 200 and first pump/compressor module 202 (e.g., smaller capacity pump/compressor) disconnected and connected to each other. FIG. 5 shows head unit 202 and second pump/compressor module 204 (e.g., larger capacity pump/compressor) disconnected and connected to each other. Notably, and as described previously, module 204 includes an additional gas separation assembly 122. As further shown in FIG. 5, when head unit 200 is connected to module 204, gas separation assemblies 106 and 122 form a stacked arrangement or configuration thereby increasing the gas separation capability of the overall system to help provide the continuous flow mode of concentrated oxygen gas to the user. FIGS. 4 and 5 also show that power source 118 can be located in the base (or as the base) of modules 202 and 204 and may be removable and exchangeable therefrom.

Head unit 200 and modules 202 and 204 have housings that physically engage or mate together in order to facilitate easy alignment for connecting and disconnecting the components. For example, in FIG. 4, head unit 200 includes a housing extension 402 (where a portion of the gas separation system 106 is located) and a recess 406. Module 202 includes a housing having an extension 404 and a recess 408. So arranged, the housing extension 402 of head unit 200 is received by the housing recess 408 of module 202. Similarly, housing extension 404 of module 202 is received by the housing recess 406 of head unit 200. Similarly, as shown in FIG. 5, module 204 has a housing extension 410 and a recess 412 for connecting with housing recess 406 and housing extension 402, respectively, of head unit 200. The exact physical form factors of the head unit and associated base unit or modules are not critical to the embodiments of the invention so long as they provide the ability to connect the functionality of the components and provide an operative system. Therefore, other physical form factors for the head unit and associated base unit or modules may be used.

Figure 6:
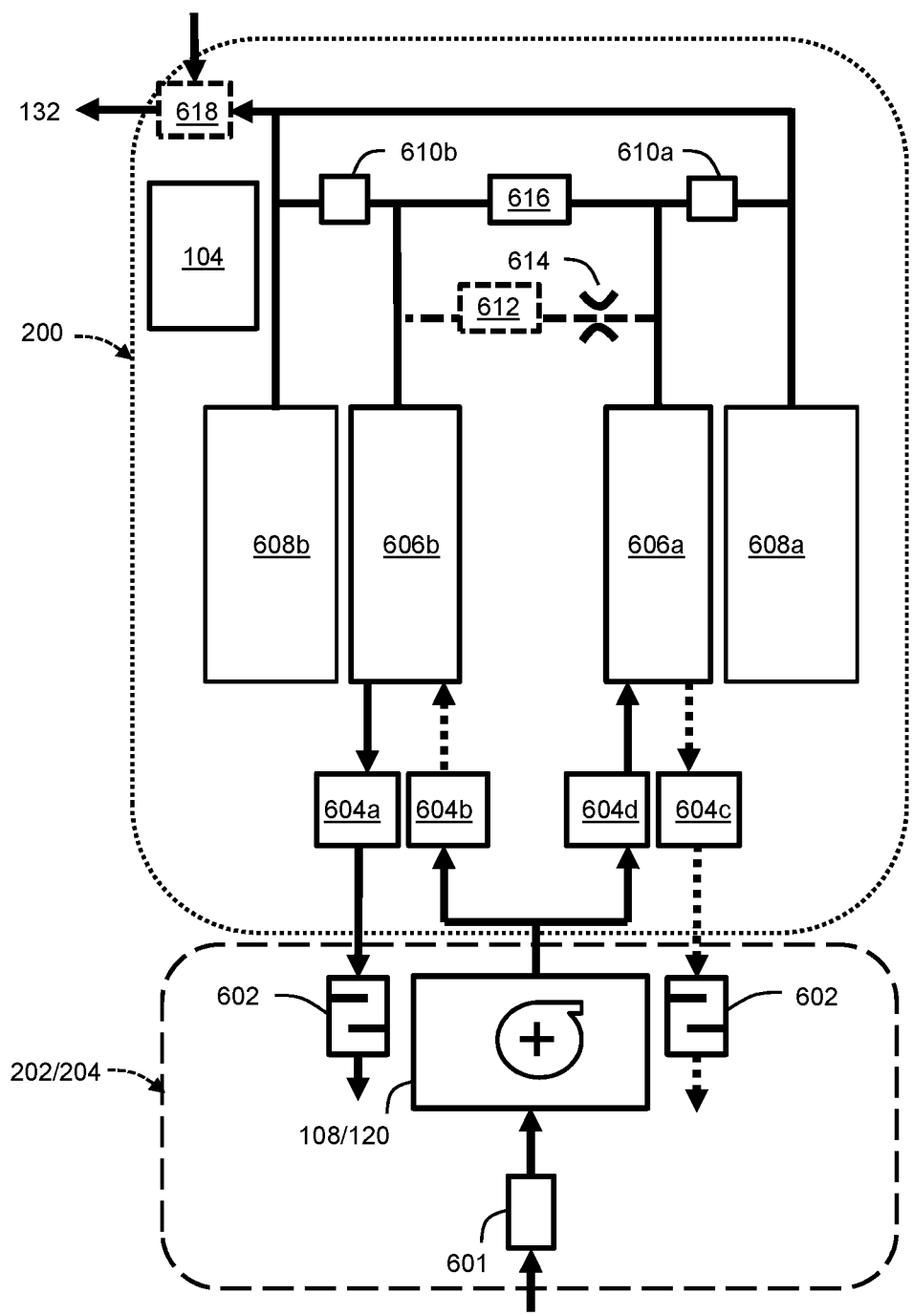
FIG. 6 is one embodiment of a pneumatic block diagram of a gas concentrating system.

FIG. 6 illustrates one embodiment of an exemplary pneumatic block diagram for a gas concentrating system using pressure swing adsorption (PSA). As previously described, head unit 100/200 can include multiple gas separation sieve beds 606a and 606b, multiple valves 604a, 604b, 604c, and 604d, multiple product tanks 608a, 608b and a conserver valve/device 618. In this embodiment, product tanks 608a, 608b are shown connected so they act as one product tank 116 but may also be arranged to act as two product tanks. Modules 202/204 can include pump 108/120 and one or more filters 601 and mufflers 602. In other embodiments, one or more of the above valves may also be located in modules 202/204 and arranged to perform the same functions described herein.

In operation, as shown by the solid lines in FIG. 6, during an exemplary fill cycle of separation bed 606a, pump 108/120 draws room air through filter 602 and to valve 604a and separation bed 606a, which produces oxygen at its output and into product tanks 608a, 608b through valve 610a. Valves 610a and 610b may be check valves or any other similarly functioning valve that allows only one-way flow.

While separation bed 606a is undergoing the fill cycle, separation bed 606b may be undergoing a purge cycle to expel any nitrogen gas from a previously fill cycle. During the purge cycle, previously pressurized separation bed 606b expels nitrogen gas through valve 604d and out to atmosphere through muffler 602. Separation bed 606b is pressurized from its previous fill cycle. During the purge cycle, an amount of oxygen from separation bed 606a or product tanks 608a, 608b can be fed into separation bed 606b to preload or pre-charge the separation bed 106b with oxygen, as controlled by optional bleed valve 612 and fixed orifice 614, shown in FIG. 6 with dashed lines.

As shown by the dotted lines in FIG. 6, once separation bed 606a has been filled and/or separation bed 606b has been purged, control system 104 switches valves 604a, 604b, 604c, and 604d so that separation bed 606b enters the fill cycle while separation bed 606a enters the purge cycle. In this state, pump 108/120 directs room air into separation bed 606b, which produces oxygen at its output and into product tanks 608a, 608b through valve 610b. During the purge cycle, an amount of oxygen from separation bed 606b or product tanks 608a, 608b can be fed into separation bed 606a to preload or pre-charge the separation bed 106a with oxygen, now flowing in the opposite direction as compared to the previous cycle. The illustrated system also includes an exemplary pressure equalization valve 616, which equalizes the pressure in the two separation beds prior to a purge/fill cycle change.

The pressure equalization valve 616 can allow for a more efficient generation of oxygen by equalizing the pressure between the outputs of a separation bed (e.g., 606a) nearing the end of its fill cycle and a separation bed (e.g., 606b) nearing the end of its purge cycle. For example, pressure equalization valve 616 may be activated to equalize the pressure between the outputs of separation bed 606a and separation bed 606b near the end of each purge/fill cycle. U.S. Pat. Nos. 4,449,990 and 5,906,672, which are fully incorporated herein by reference, further describe the operation of pressure equalization valves. In this manner, each separation bed 606a, 606b cyclically undergoes alternating fill and purge cycles as controlled by control system 104.

As shown in FIG. 6, optional conserver valve/device 618 may be used to control the delivery of product gas to a user. Conserver valve may switch between providing concentrated product gas from the product tanks 608a, 608b or venting to the room air. For example, the conserver valve may be used to selectively provide various continuous or pulsed flows of oxygen concentrated product gas in an amount and at a time determined by the control system 105. This time is typically upon the senses of an inhalation by the user and is typically determined by sensing a drop in pressure or flow proximate the user's nose or mouth.

In this embodiment, control system 104 may utilize various control schemes to optimize the production and delivery of concentrated product gas by controlling the activation, levels, and relative timing of pressure source 108/120 and valves 604a, 604b, 604c, 604d, 616, and 612, for example. While FIG. 6 illustrates a pressure swing adsorption (PSA) cycle, other gas concentrating cycles may also be used including vacuum swing adsorption (VSA), vacuum—pressure swing adsorption (VPSA) or other similar modes. The particular gas concentrating mode is not critical to the embodiments of the invention described herein so long as they are capable of producing a concentrated gas such as oxygen to the user. Examples of the above modes of operation are disclosed and, for example, U.S. Pat. Nos. 9,266,053 and 9,120,050 which have been fully incorporated by reference.

Figure 7:
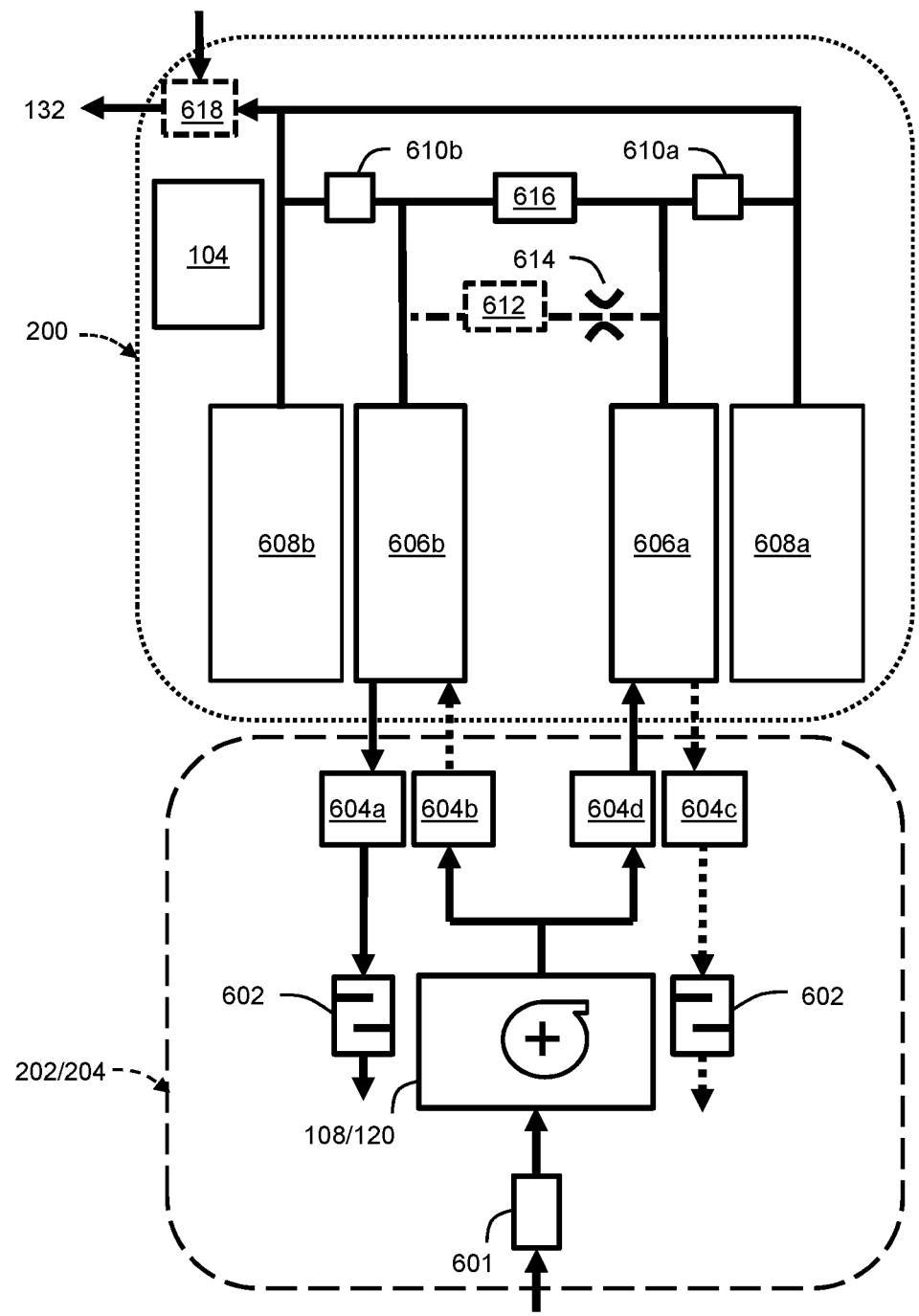
FIG. 7 illustrates an embodiment similar to FIG. 6 but with different valve locations.
Figure 8A:
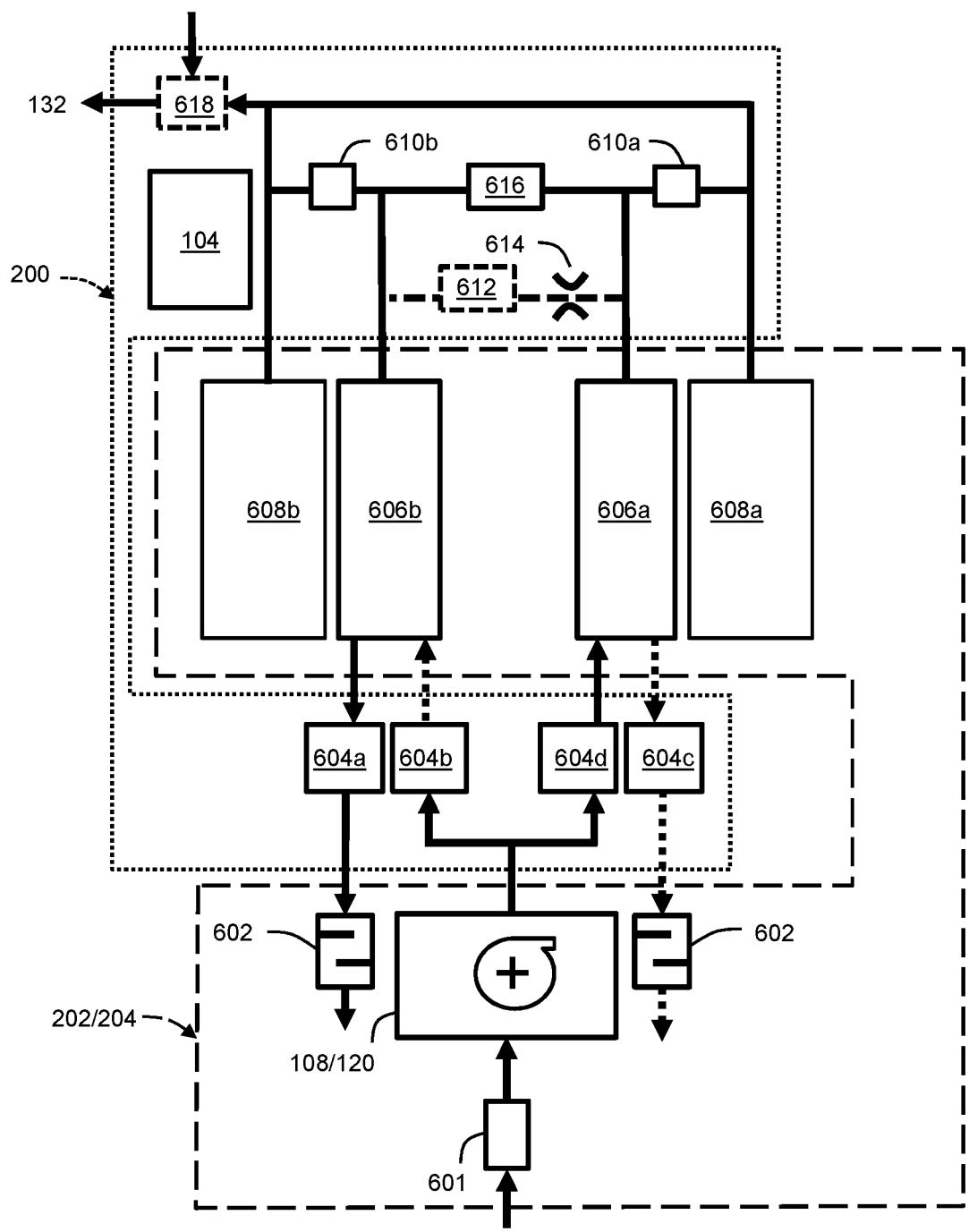
FIG. 8 illustrates an embodiment similar to FIG. 6, but with different valve and gas separation assembly locations.

FIG. 7 illustrates an embodiment similar to FIG. 6, but where valves 604a-d are instead located within module 202/204 instead of module 200. FIG. 8A shows yet another embodiment similar to FIG. 6, but where module 202/204 includes the air separation beds 606a and b and product tank(s) 608a and b. Also shown in FIG. 8A, module 200 includes substantially all of the valves, including valves 604a-d. In a further embodiment shown in FIG. 8B, the valves shown in FIG. 8 (e.g., valves 604a-c, 610a and b, 612, 616 and fixed orifice 614) can be located in module 202/204 instead of module 200.

Figure 8B:
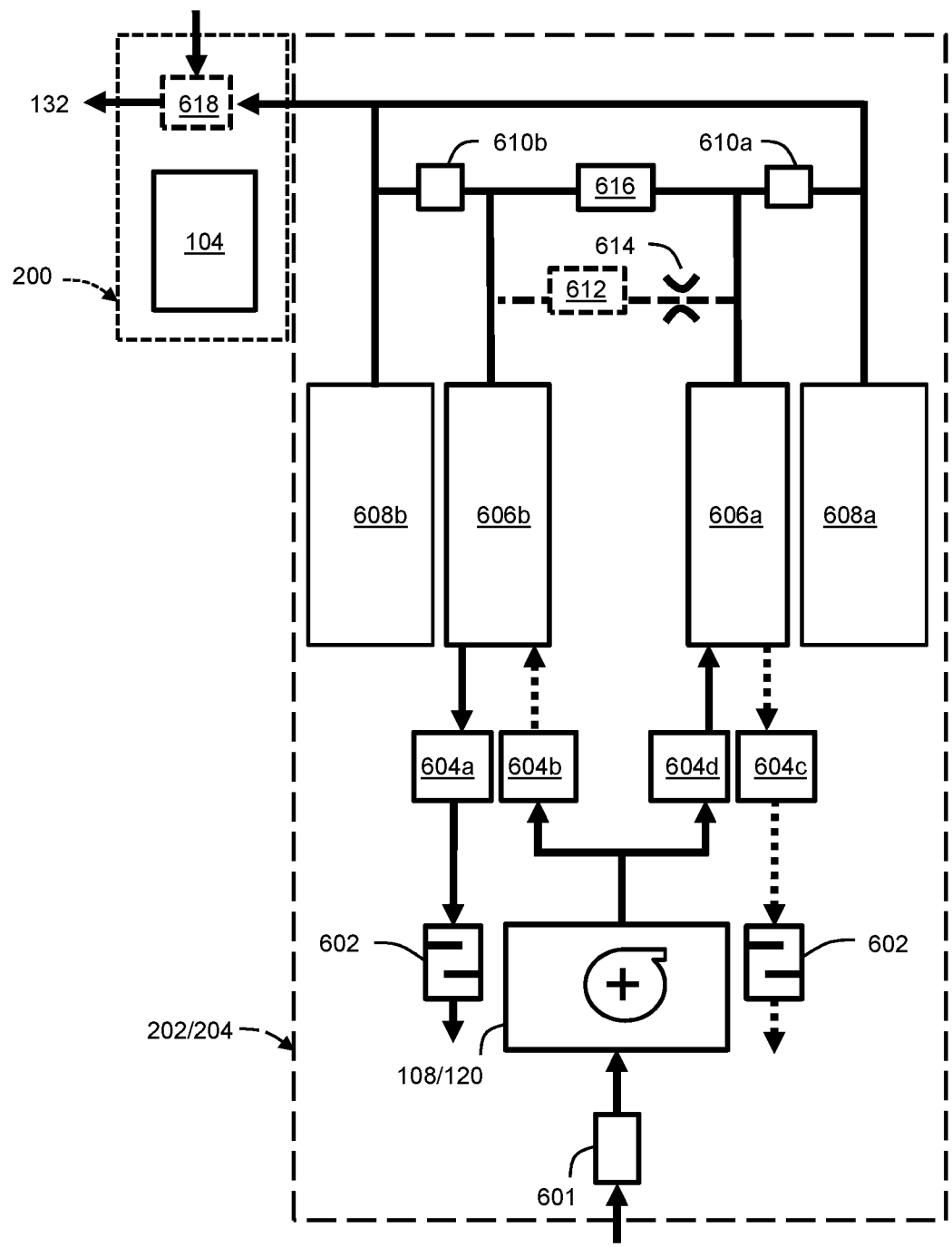

The embodiments of FIGS. 8A and 8B allow for a small user interface module 200 to be used with multiple sized modules 202/204. This provides the user with a familiar control or user interface that is reusable with different sized (gas separation and compressor) modules 202/204. In other words, a user would not have to learn how to use a different user interface or controls as they configure or reconfigure their system to larger or smaller capacity. This embodiment will be described further in connection with FIGS. 18-22.

Figure 9:
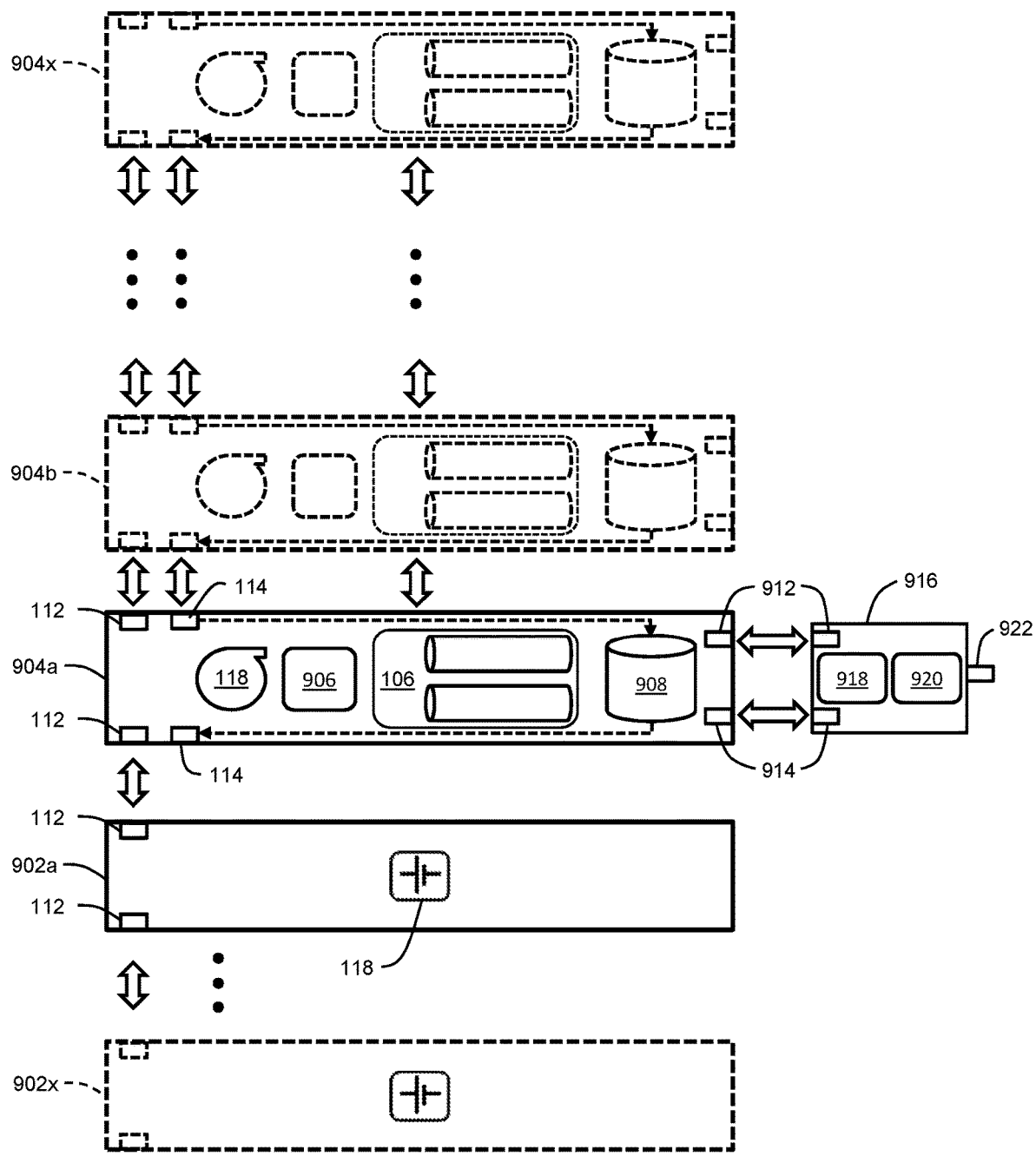
FIG. 9 illustrates an embodiment of multiple (or mini) gas separation modules/systems that are configurable (or stackable) to define a given output requirement.

FIG. 9 illustrates another embodiment that is modular and stackable (or configurable) to provide various output capabilities. In this embodiment, modules may be stacked or connected together to increase the output capability of the overall system. Each module can function independent of other modules or in conjunction therewith through control logic. For example, power module 902a contains the previously described rechargeable fuel cell or battery 118 and data/electrical port 112 used to power the gas separation modules 902a-x to be attached thereto. Also, power module 902a can be stacked or configured with additional power modules (e.g., 902x) to provide increased (or decreased) power capacity, as needed.

Modules 904a-x provide gas separation functionality and are stackable or configurable to provide the desired concentrated gas output capability (e.g., 1-5 liters per minute or equivalent pulsed flow output). Module 904a includes, for example, the previously described pressure/vacuum source 118 (which may also include one or more micro-pumps having piezoelectric, electrostatic, thermo-pneumatic, pneumatic or magnetically driven diaphragms, membranes and/or flaps (see, e.g., U.S. Pat. No. 9,266,053, which is hereby incorporated by reference), gas separation assembly 106, operational valves and controller 906, gas/fluid valve manifolds and product tank(s) 908.

Module 904a also includes data/electrical ports 112 and gas/flow ports 114 for connectivity to other modules. Module 904a further includes data/electrical port 912 and gas/flow port 914 for connectivity to module 916. Module 916 includes similar ports 912 and 914 and includes a conserver device 920 and associated controller 918, and patient output 922. Ports 912 and 914 are similar to ports 112 and 114. In an alternate embodiment, module product tanks 908 can be removed and tubing (which can be straight or coiled to increase volume) between modules 904a-x and contained within module 916 (or even modules 904a-x) provide a volume acting as a product tank (see FIG. 10). In yet another embodiment, product tanks of either configuration (tanks or tubing) can be located in both modules 904a-x and 916. Configured as such, modules 902a-x, 904a-x, and 916 can be connected to form a functional gas separation system similar to the previous described embodiments (e.g., FIGS. 1A and 2A) and scalable concentrated product gas output capacity.

To adjust (e.g., increase or decrease) the system capacity, additional modules can be stacked or configured. For example, one or more of modules 904b-x can be added to the configuration to increase system capacity. Modules 904b-x can be identically or similarly configured to module 904a to provide incremental additional system capacity. As shown, all modules are provided with the appropriate data/electrical ports (e.g., 112) and gas/flow ports (114) to allow a fully configurable and controllable system. Further, since modules 904a-x can be identical or similar, they can be replaced or swapped without the need for additional configuration. Each module 904a-x further contains a housing having the aforementioned guiding mechanism and physical locking mechanism to allow the modules to be stacked or physically connected together (vertically or horizontally). Furthermore, the pump/vacuum source 118 of each module 904a-x can be replaced or swapped out without having to open a module housing.

In these embodiments, the controller logic further includes one or more of instructions for reading and determining how many modules are connected, timing of all flow components (e.g., pressure/vacuum sources and valves and conserver device) based on connected modules and appropriate diagnostics. Each module can be designed and sized to be small enough to fit within a clothing pocket (e.g., approximately 5-7.5 inches wide by 5.5-7 inches deep) and should have a target weight of less than 1 lb. A carry bag can be provided for the entire configured system that includes, for example, zipped top and bottoms. This allows additional carry bags to be combined through the zipped top and bottoms of each bag as additional modules are added to the overall system.

Figure 10:
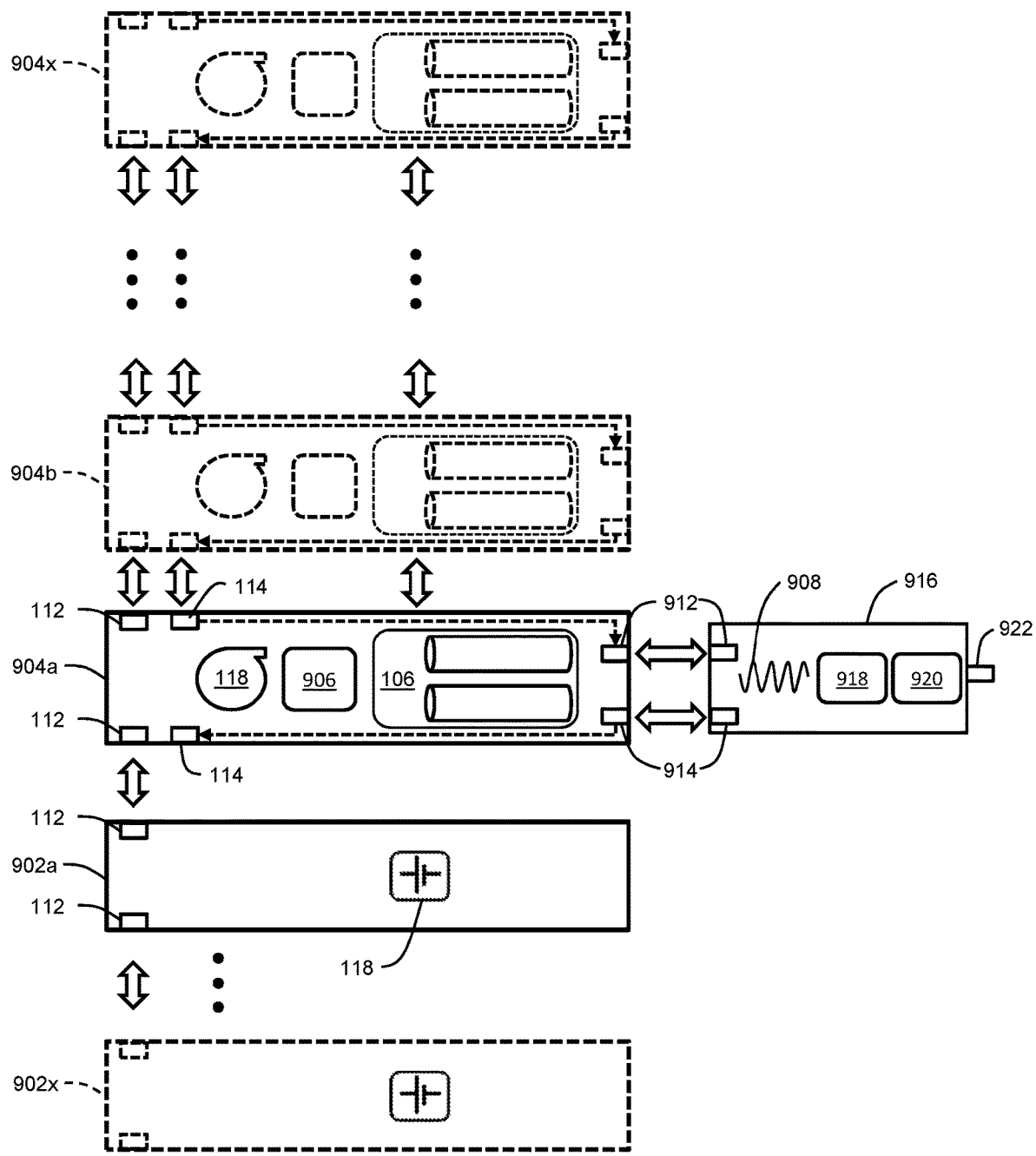
FIG. 10 illustrates another embodiment of multiple (or mini) gas separation modules/systems that are configurable (or stackable) to define a given output requirement.

The embodiments of FIGS. 9 and 10 also allow for a small user interface module 916 to be used with multiple sized modules 904a. This provides the user with a familiar control or user interface that is reusable with different sized (gas separation and compressor) modules 904a. In other words, user would not have to learn how to use a different user interface or controls as they configure or reconfigure their system to larger or smaller capacity. This embodiment will be described further in connection with FIGS. 18-22

Figure 11A:
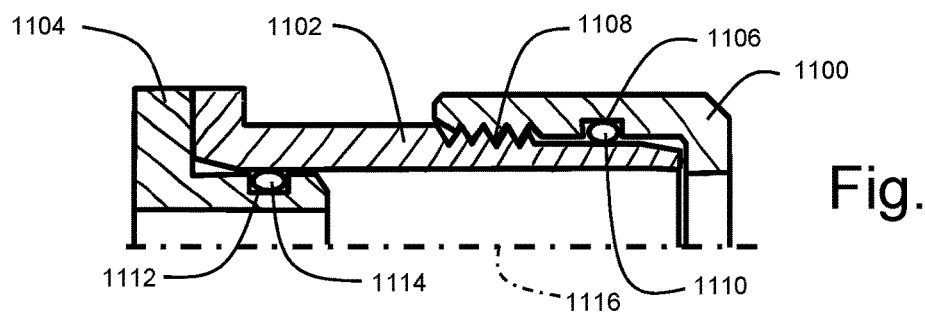
FIGS. 11A-11H illustrate various embodiments of pneumatic port arrangements for connecting modules.

Referring now to FIG. 11A, one structural embodiment of a pneumatic port (e.g., 114) is shown in cross-section (relative to centerline 1116). The port includes a male to female connection having female connector 1100 and male connector 1102. Male connector 1102 may be further integrated or connected to a housing section 1104 of a module. Female connector 1100 may similarly be connected to or integral to a module housing section. In the embodiment show, female connector 1100 includes a recess 1106 for at least partly containing a gasket or O-ring 1110. Housing section 1104 can contain a similar recess 1112 for at least partly retaining a gasket or O-ring 1114. Gaskets or O-rings 1110 and 1114 physically engage male connector 1102 as shown to seal the connection from gas leaks. Female and male connectors 1100 and 1102 also include grooves and ridges 1108 allowing for quick connect and disconnect. While the male and female connectors are shown as symmetrical prong/receptacle configurations, this configuration is not critical and other configurations and embodiments are possible so long as sealing, connecting and disconnecting can be provided.

Figure 11B:
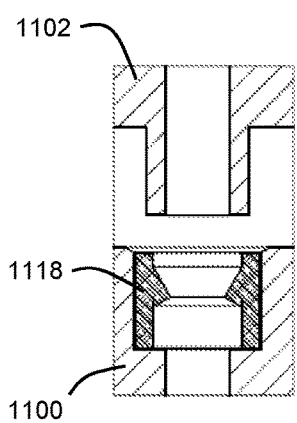
Figure 11C:
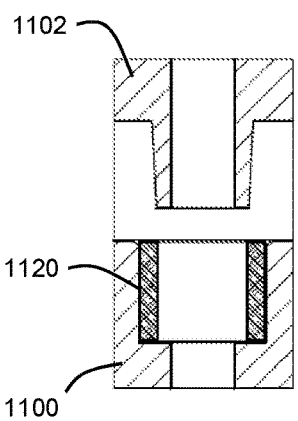
Figure 11D:
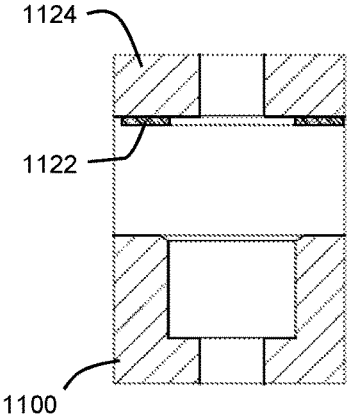
Figure 11E:
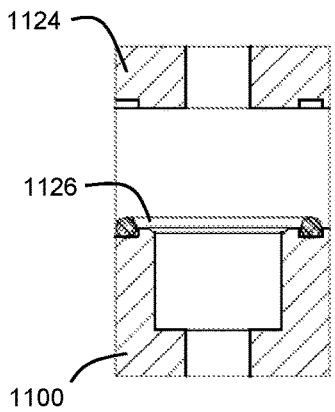
Figure 11F:
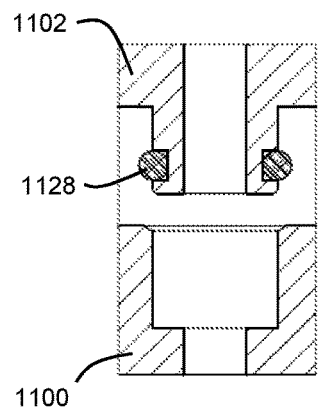

FIGS. 11B-F show alternative pneumatic port arrangements in cross-section. In FIG. 11B, the seal is barbed member 1118 that is designed to grab and seal against male connector 1102. In FIG. 11C, the seal is interference member 1120 that is designed to seal against male member 1102. In FIG. 11D, the seal is compression member 1122 affixed to module housing portion 1124 (which is in lieu of a male member 1102) and is designed to seal against female member 1100. In FIG. 11E, the seal is O-ring member 1126 that is affixed to female member 1100 and designed to seal against module housing portion 1124. In FIG. 11F, the seal is O-ring 1128 affixed to male member 1102 and designed to seal against female member 1100.

Figure 11G:
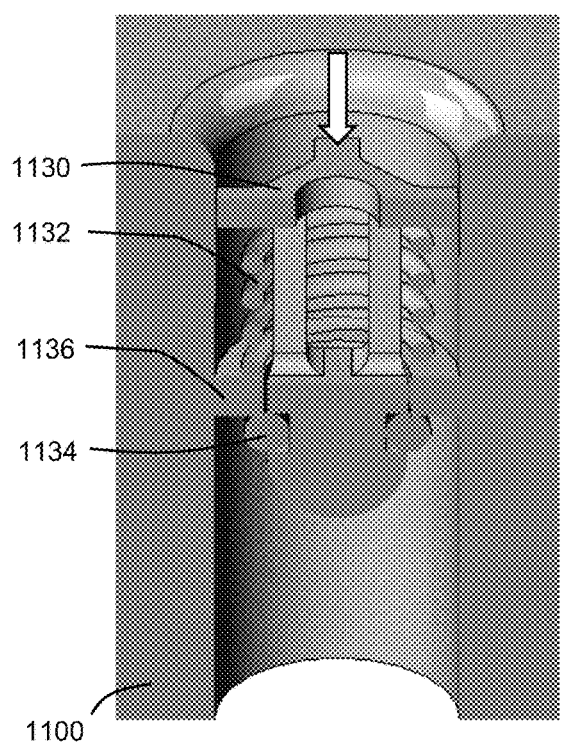
Figure 11H:
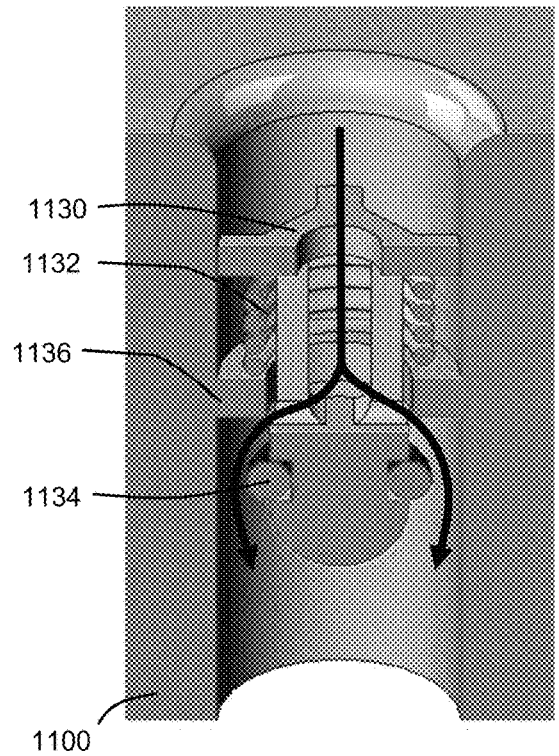

FIGS. 11G and 11H show yet another embodiment of a pneumatic port with a valve (e.g., a check valve) in cross-section. FIG. 11G shows the port in its normally closed position and FIG. 11H shows the port in its normally open position. The check valve operates to open when a force (as shown by the arrow in FIG. 11G) is applied to base surface 1130. This causes spring 1132 to compress, which allows the valve's poppet and sealing O-ring 1134 to move away from inner sealing flange 1136. As shown in FIG. 11H, this creates an opening allowing air or gas to flow (see arrows in FIG. 11H) through the port and valve. When the force (shown by the arrow in FIG. 11G) is removed from base surface 1130, the valve returns via spring 1132 to its normally closed position. This force is normally generated by insertion of a feed fitting (e.g., a male fitting) or pneumatic (exit) port from another module. The exact configuration of the sealing arrangement is not critical and other configurations are intended to be covered by the disclosure of these examples.

Figure 12A:
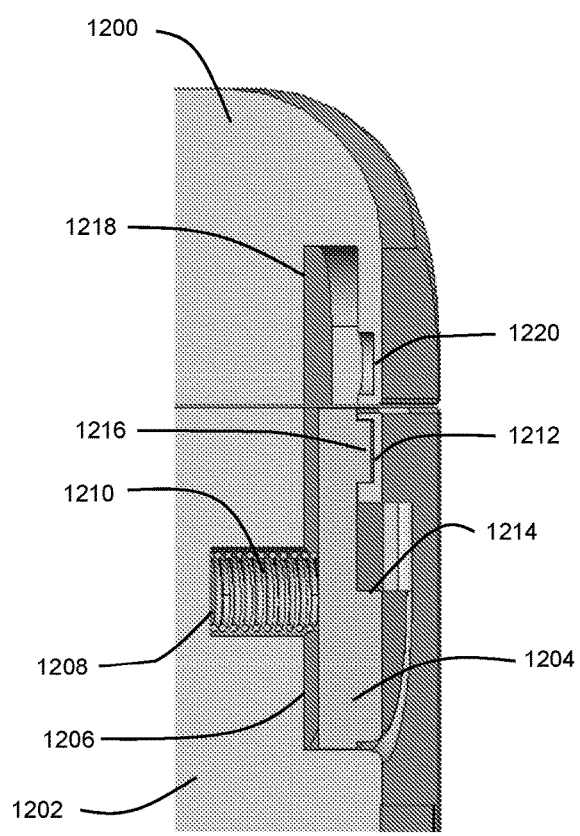
FIGS. 12A-12B, 13A-13B, 14A-14B, 15, 16A-16I, and 17A-17D illustrate various embodiments of arrangements for locking/connecting and unlocking/disconnecting two or more modules together.
Figure 12B:
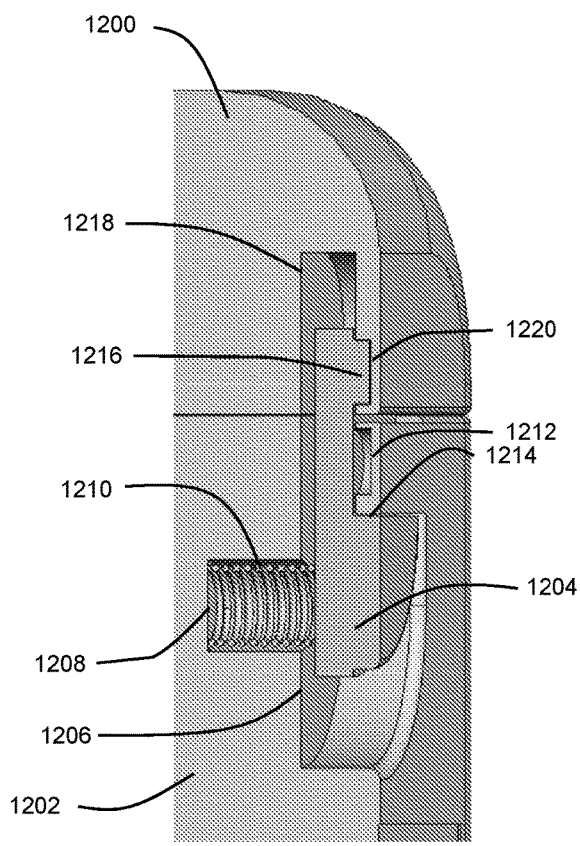

Illustrated in FIGS. 12A and 12B is one embodiment of an arrangement for connecting and locking two modules together. FIG. 12A shows the arrangement in the unlocked state and FIG. 12B shows the arrangement in the locked state. Housing 1200 is associated with a first module and housing 1202 is associated with a second module. A moveable plunger 1204 is used to connect and lock and unlock the modules together.

Housings 1200 and 1202 include chambers 1206 and 1218 for housing and accommodating moveable plunger 1204. Housing 1202 also includes a chamber 1208 for housing a spring 1210. Spring 1210 is compressible and normally exerts an outward pressure plunger 1204. Referring to FIG. 12A, plunger 1204 includes an extension 1216 that in the unlocked state resides in recess or receptacle 1212 by the outward pressure of spring 1210. In this unlocked state, plunger 1204 and its extension 1216 remain in chamber 1206 and the two modules housings (1200 and 1202) are not locked together.

Pressing plunger 1204 on its outward surface causes spring 1210 to compress and moves plunger extension 1216 out of recess 1212. Plunger 1204 can now slide into chamber 1218 residing in the second module's housing 1200. Chamber 1218 in the second module housing 1200 also includes a recess or receptacle 1220. The extension 1216 of the plunger is guided into recess or receptacle 1220 by the chamber geometry and stop surface/wall 1214 on plunger 1204. When extension 1216 is in recess 1220, the two modules are locked together and maintained that way by the outward force of spring 1210 after the pressing of plunger 1204 is discontinued. Unlocking of the modules is accomplished the same way (i.e., by pressing plunger 1204 and moving it back into chamber 1206 until extension 1216 finds recess 1212).

Figure 13A:
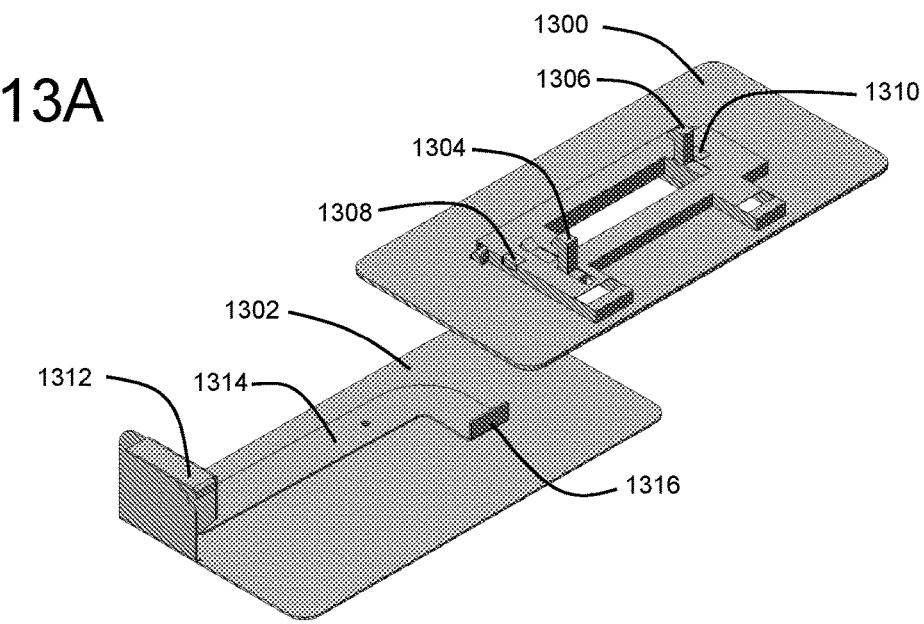

FIGS. 13A-15 show another embodiment of a connecting and locking arrangement for the modules. FIGS. 13A and 13B illustrate the structural components of the arrangement resident on a first module's housing. FIG. 13A illustrates two sub-assemblies that connect to form a locking and unlocking mechanism. A lever sub-assembly includes a base 1302, lever 1314 and button 1312. Lever 1314 includes a contact wall or surface 1316. A prong sub-assembly includes base 1300, locking prongs 1304 and 1306 and ejection prongs 1308 and 1310. Locking prongs 1304 and 1306 and ejection prongs 1308 and 1310 are shown in the locked state. Locking prongs 1304 and 1306 as shown in FIG. 13A engage recesses in a second module housing (not shown) to lock the modules together.

Figure 13B:
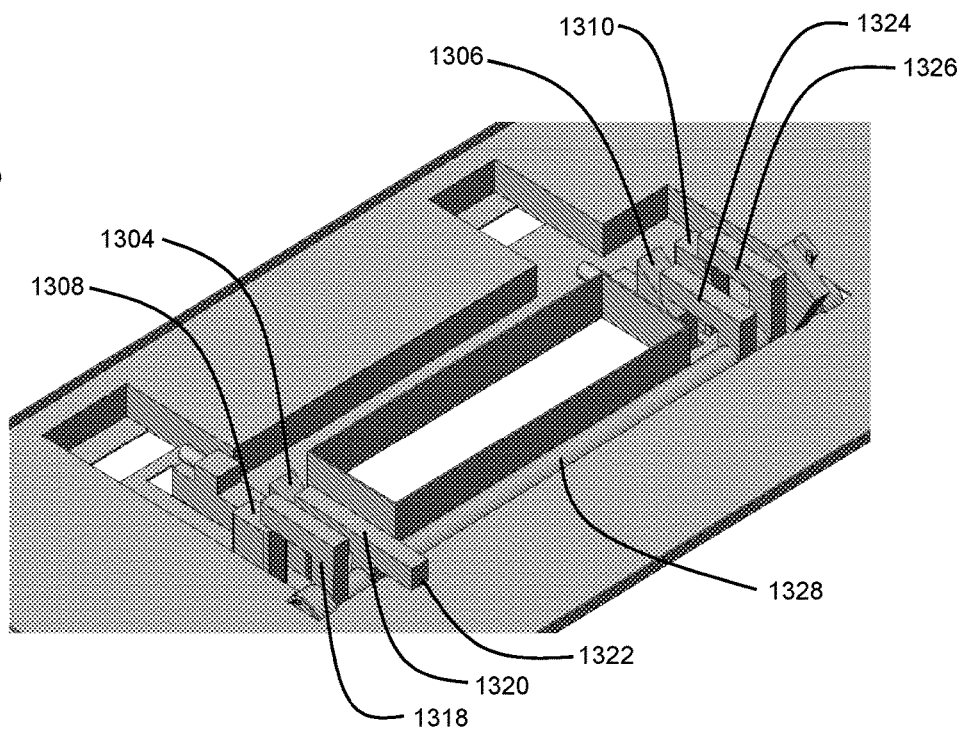

As further shown in FIG. 13B, the prong sub-assembly includes levers 1318, 1320, 1324 and 1326, which are connected to shaft 1328. Levers 1318, 1320 and 1326 are shown as generally "L" shaped and lever 1322 is shown as generally "T" shaped. Lever 1320 has a surface 1322 for engagement with contact surface 1316 (in FIG. 13A) to cause unlocking of the modules.

Figure 14A:
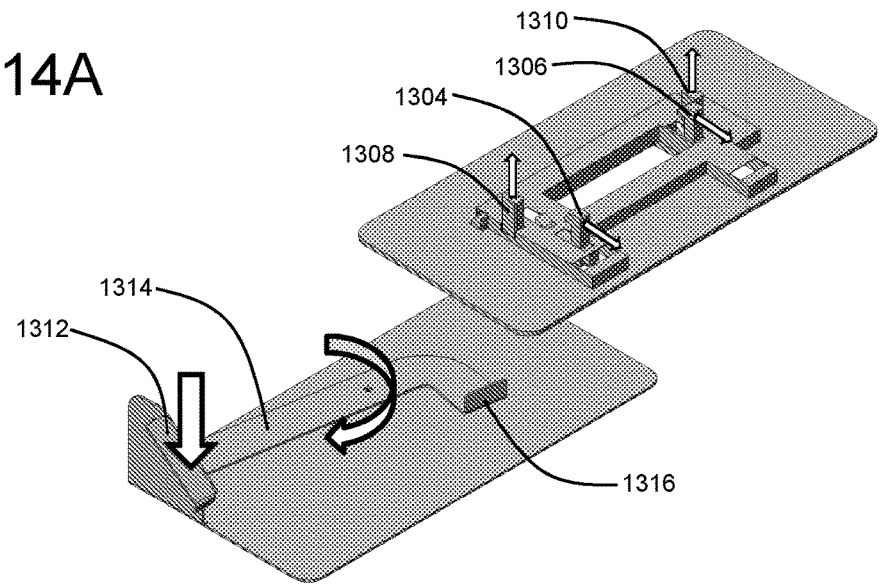
Figure 14B:
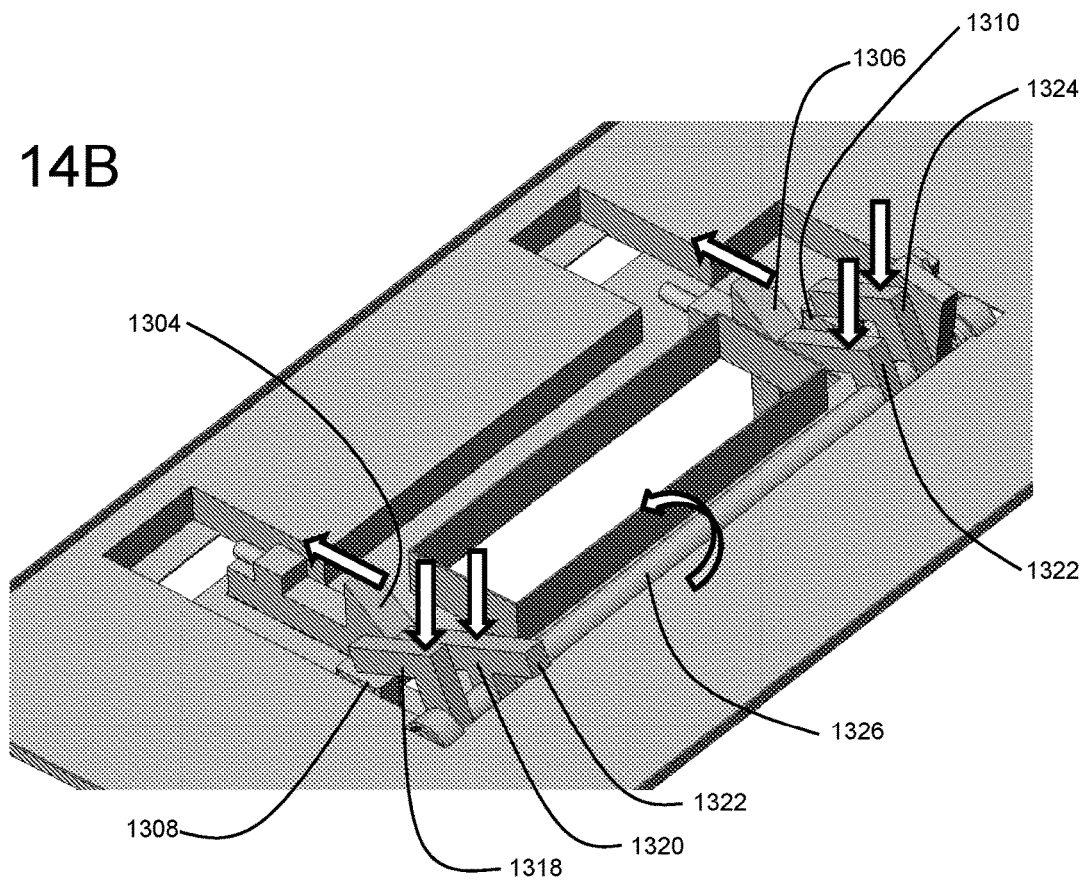

Referring now to FIGS. 14A and 14B, the operation of the arrangement will now be discussed. Referring specifically to FIG. 14A, pressing button 1312 in the direction the down arrow causes lever 1314 to rotate in the arrow direction shown. This causes surface 1316 to contact and move surface 1322 (shown in FIG. 13B). This action causes locking prongs 1304 and 1306 to move or slide in the arrow direction shown to release or unlock the second module. This action also causes ejection prongs 1308 and 1310 to rise outward/upward to push or eject the second module from the unlocked connection.

Figure 15:
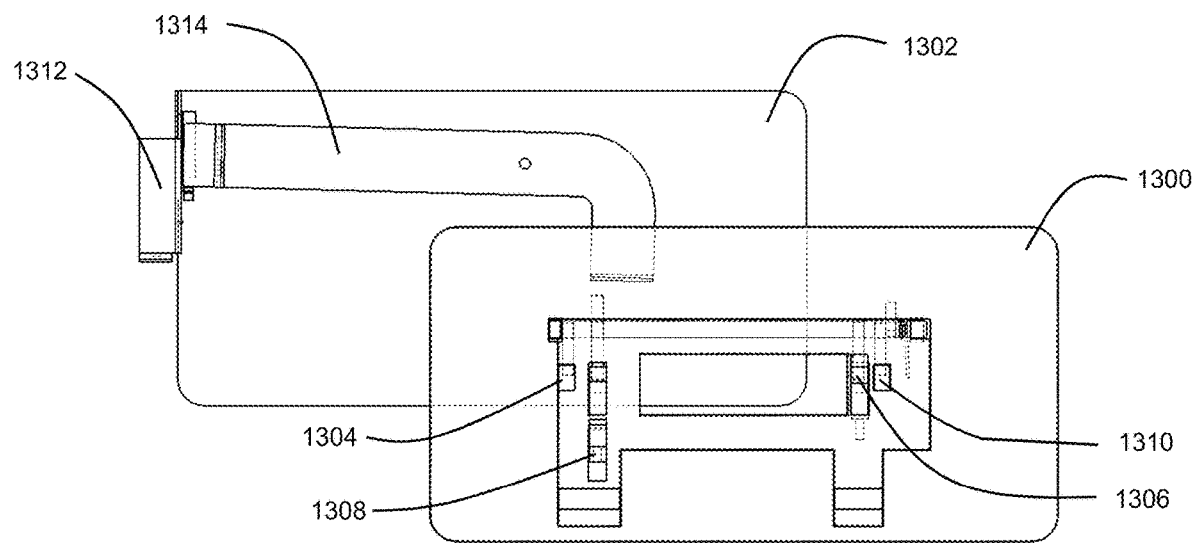

These actions are produced when surface 1316 on lever 1314 contacts surface 1322 on lever 1320. This causes shaft 1326 to rotate in the arrow direction shown and causes levers 1318, 1320, 1322 and 1324 to rotate and apply the arrow forces shown on locking prongs 1304 and 1306 and ejection prongs 1308 and 1310. Levers 1318 and 1322 apply the arrow force shown to the bottom surfaces of ejection prongs 1308 and 1310 thereby causes these prongs to rise outward/upward to eject the second module. Levers 1320 and 1322 apply the arrow force shown to a cammed surface on each of locking prongs 1304 and 1306 to move or slide these prongs out of locking position in the second module housing thereby unlocking the two modules. Springs may be used to bias the levers/prongs to their locked position as the normal state (shown in FIGS. 13A and B). FIG. 15 shows the relative positioning of the lever and prong assemblies applied to a housing of a first module.

Figure 16A:
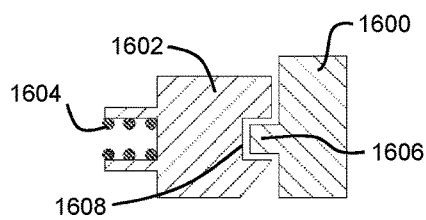
Figure 16E:
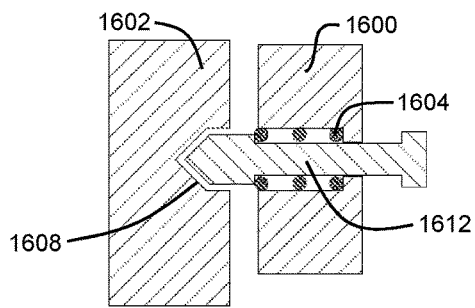
Figure 16B:
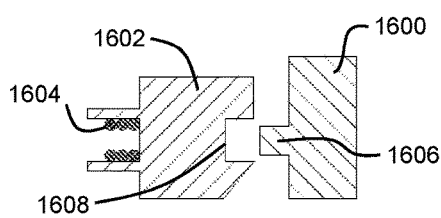
Figure 16F:
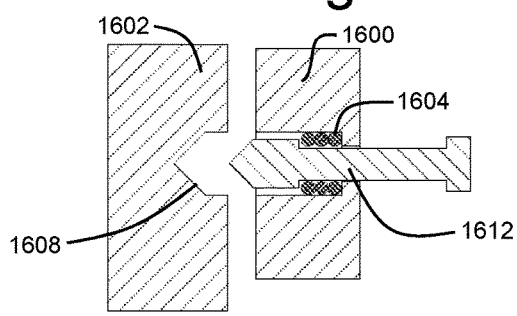
Figure 16C:
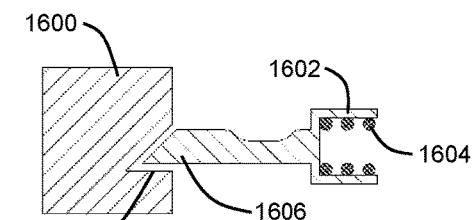
Figure 16D:
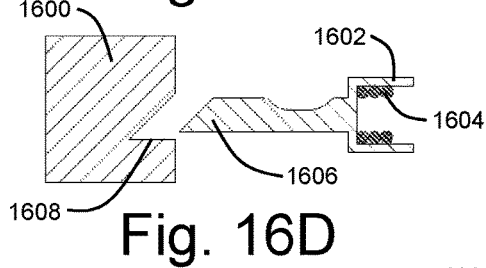
Figure 16G:
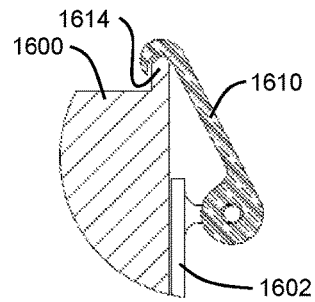
Figure 16H:
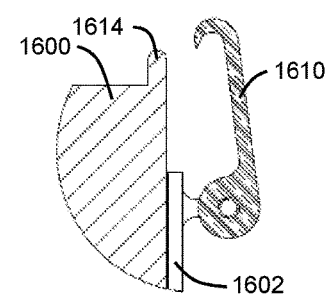
Figure 16I:
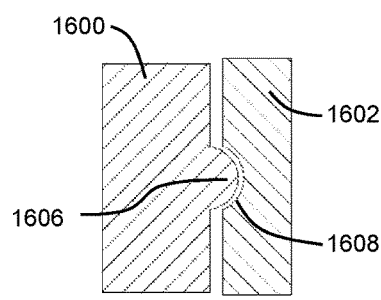

FIGS. 16A-16I illustrate further alternative arrangements for connecting two or more modules together. FIGS. 16A-16F illustrate various spring-loaded locking structures on or associated with module housings 1600 and 1602. In FIGS. 16A and 16B, module housing 1602 includes a spring-loaded receptacle (or female member) that captures extension 1606 of module housing 1600 in recess 1608 thereby connecting and locking the modules together. Compressing spring 1604 releases extension 1606 from recess 1608 and disconnects and unlocks the modules. FIGS. 16C and 16D showing locked and unlocked modules are similarly arranged except for the geometry of extension 1606 and the action of spring 1604 being against extension 1606. FIGS. 16E and 16F showing locked and unlocked modules are similarly arranged except that a movable plunger 1612 is used with spring 1604 acting thereon. FIGS. 16G and 16H showing locked and unlocked modules and illustrates the use of a hinged resilient hook 1610 that can flex over and mate with an extension 1614. Resilient hook 1610 can also flex to release from its mating connection with extension 1614. FIG. 16I shows locked modules and illustrates the use of a friction or interference fit arrangement whereby extension 1606 can move or slide/glide along housing portion 1602 until it finds recess 1608 to lock the modules. Unlocking the modules is similarly accomplished by moving extension 1606 in a sliding/gliding manner out of recess 1608. The exact configuration of connecting and locking arrangement is not critical to the invention as long as the modules can be connected and locked and unlocked. Therefore, the chambers, spring, plunger, and recesses may take alternative forms and geometries.

Figure 17A:
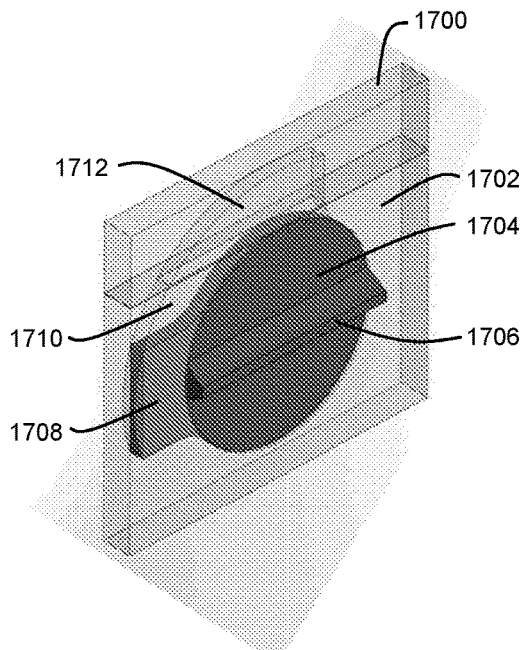
Figure 17B:
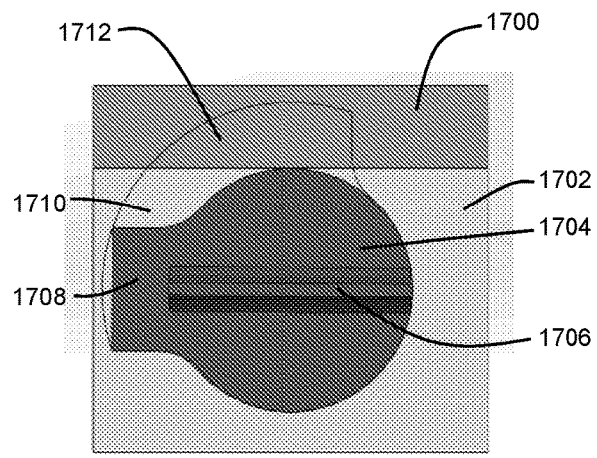
Figure 17C:
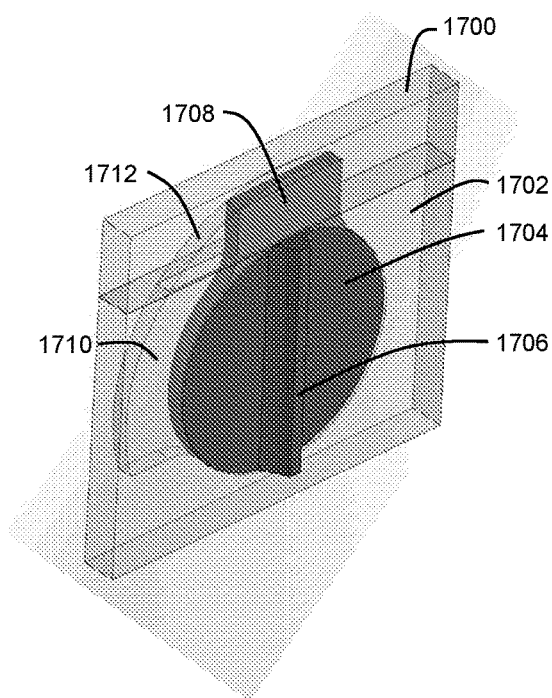
Figure 17D:
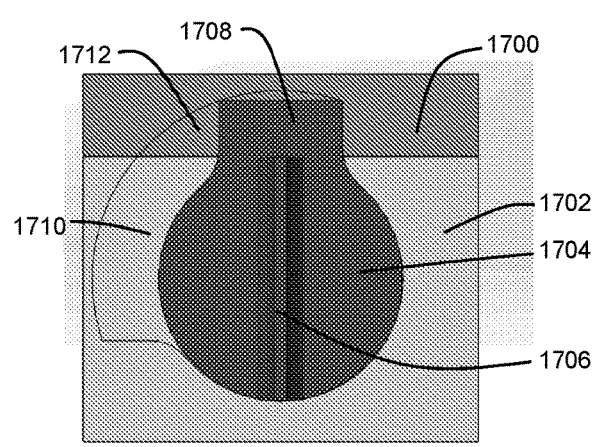

FIGS. 17A-17D illustrate a further alternative arrangement for connecting two or more modules together using a twist-to-lock arrangement. FIGS. 17A and 17B show two modules 1700 and 1702 in the unlocked or disconnected condition. FIGS. 17C and 17D show the modules in the locked or connected condition. Referring to FIGS. 17A and 17B, the arrangement includes a twist mechanism having base 1704 and an extending twist handle 1706. The twist mechanism further includes a tab 1708 extends from base 1704. In the illustrated embodiment, handle 1706 and tab 1708 are integrally formed with base 1704, but do not necessarily need to be so formed and can be separate components connected together. The twist mechanism base 1704 and tab 1708 are positioned within a cavity 1710 in a portion of the housing of module 1702. Housing 1700 also includes a cavity 1712 for accepting tab 1704 to allow locking of the modules (see FIGS. 17C and 17D).

As shown in FIGS. 17C and 17D, cavities 1710 and 1712 are configured to allow tab 1708 to move or be rotated into a position locking or connecting modules 1700 and 1702. Tab 1708 is moved by rotating base 1705 via handle 1706. This rotational, or twisting, movement causes tab 1708 to move from cavity 1710 in housing module 1702 to cavity 1712 in housing module 1700. In this condition, tab 1708 locks the relative positions of the two modules together. Unlocking is accomplished by reversing the rotation, or untwisting, so that tab 1708 returns to the position shown in FIGS. 17A and 17B. A friction or interference fit can be used between tab 1708 and cavities 1710 and 1712 in order to prevent undesired rotation of tab 1708 once it has been placed in its desired rotation. Other arrangements can also be used for maintaining tab 1708 in its desired position such as, for example, a detente mechanism, snap-fit ball and socket or other similar arrangements.

Figure 18A:
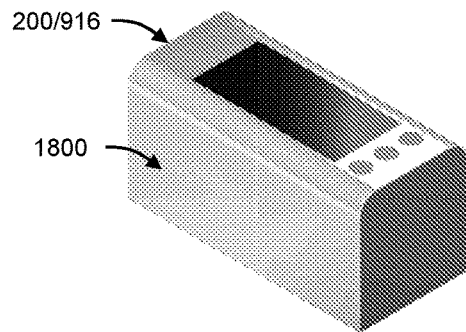
FIGS. 18A-21 illustrate various embodiments of a control module with a user interface that is re-usable with various size capacity concentrated gas second modules.
Figure 18B:
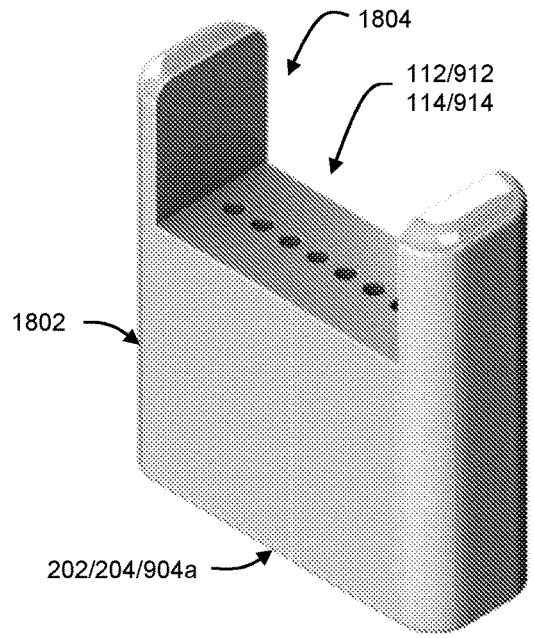
Figure 18C:
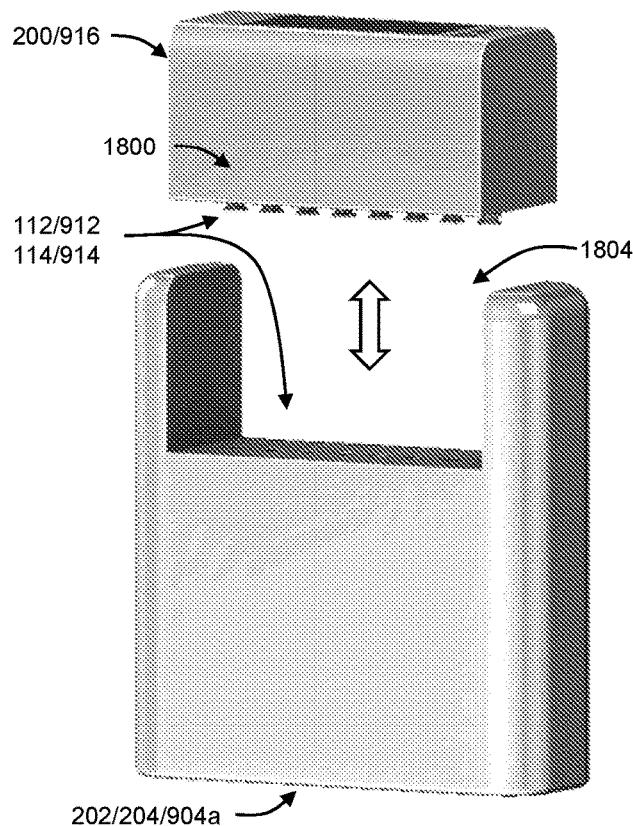

Referring to FIGS. 18A-C, another example of a modular system is shown. The system includes module 200 (or 916) and module 202 (or 204a or 904a). (See FIGS. 8A-B and 9). In the embodiment where module 200 includes valves (e.g., see FIG. 8A), the valves and other components are sized for the maximum capacity of the system.

Module 200 connects and disconnects from module 202. Module 200 includes housing 1900 and module 202 includes housing 1902. Housings 1800 and 1802 are arranged to allow modules 200 and 202 to operatively connect and disconnect from each other thereby allowing the system to change capacity, as described in more detail below. In the embodiment shown, housing 1802 includes a space 1804 for physically connecting to housing 1800 in order to form a system.

Figure 19A:
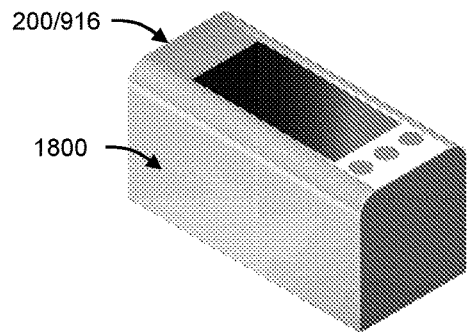
Figure 19B:
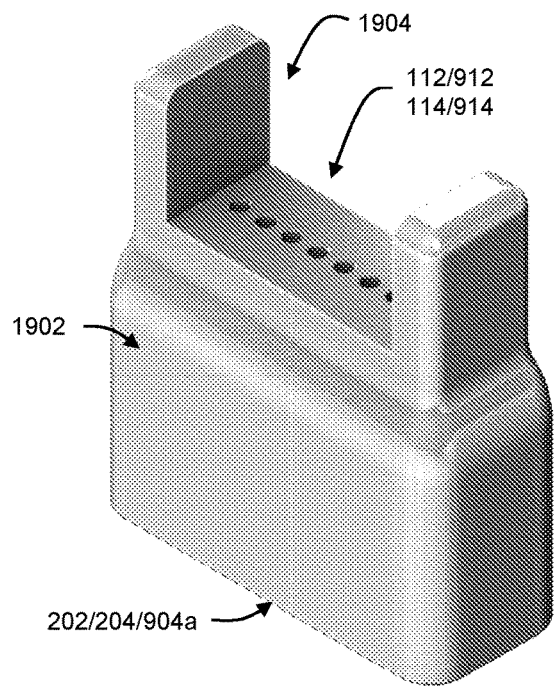
Figure 19C:
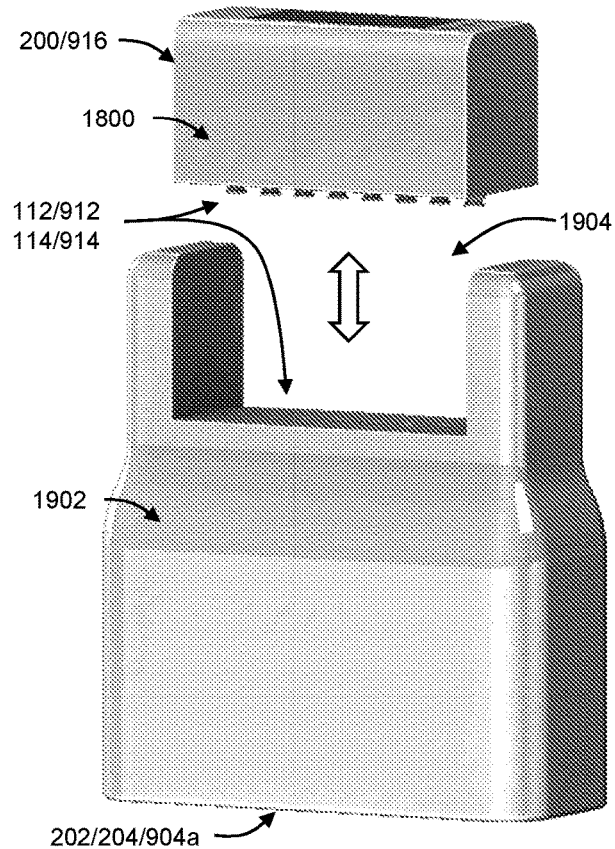

In this embodiment, module 200 is shown with a user interface including a display and various input buttons or touch sensors and module 200 is usable with different capacity modules 202. Module 202 is, for example, sized to provide a first concentrated oxygen gas capacity (e.g., 1 or 2 liters per minute, etc.). FIGS. 19A-C illustrate module 200 with the user interface being used with a larger capacity module 202 to provide a second (or even third, etc.) concentrated oxygen gas capacity (e.g., 3+ liters per minute). Module 202 in FIGS. 19A-C is physically larger in size because its components (compressor, sieves, product tank, etc.) need to be increased in size (and capacity) to provide the larger concentrated oxygen gas capacity. Notably, housing 1902 similarly includes space 1904 for connecting with housing 1800 in a similar manner to FIGS. 18A-C.

Figure 20A:
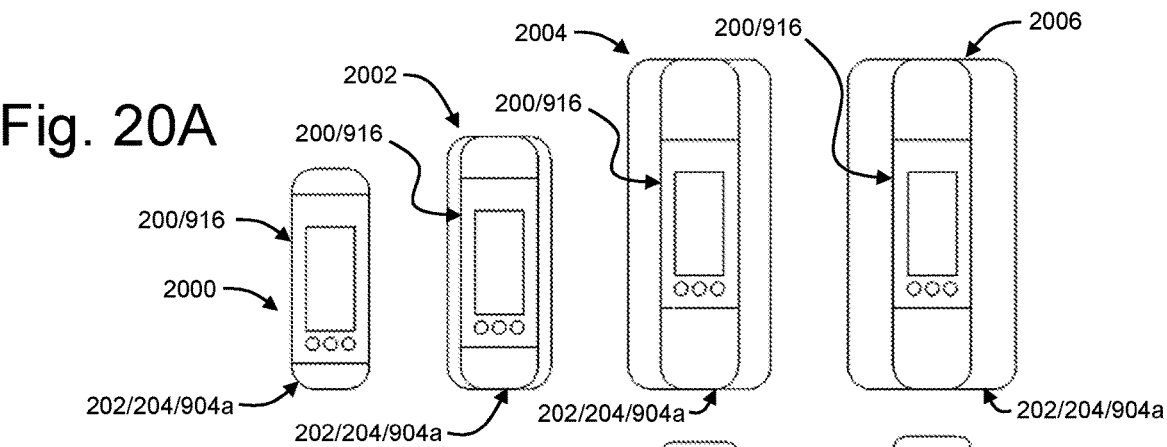
Figure 20B:
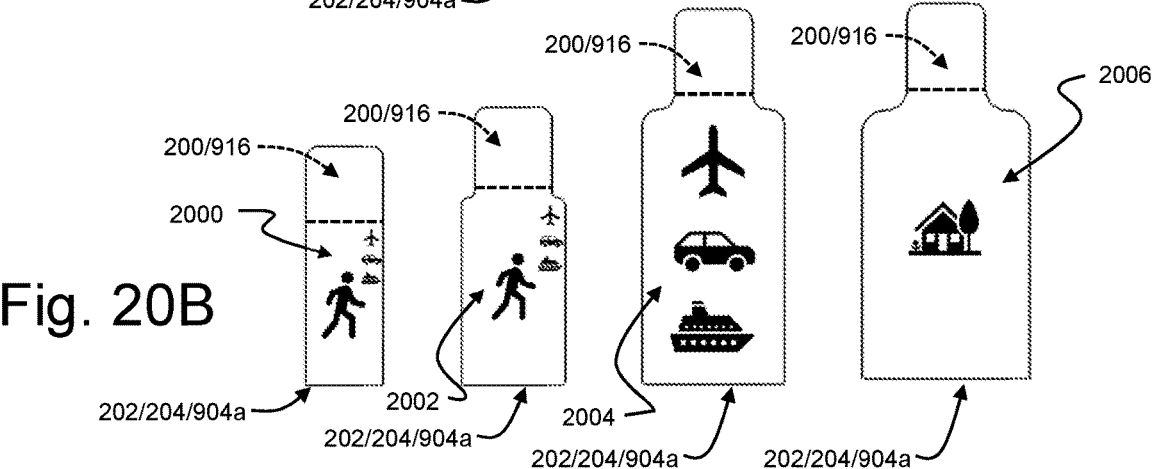
Figure 21:
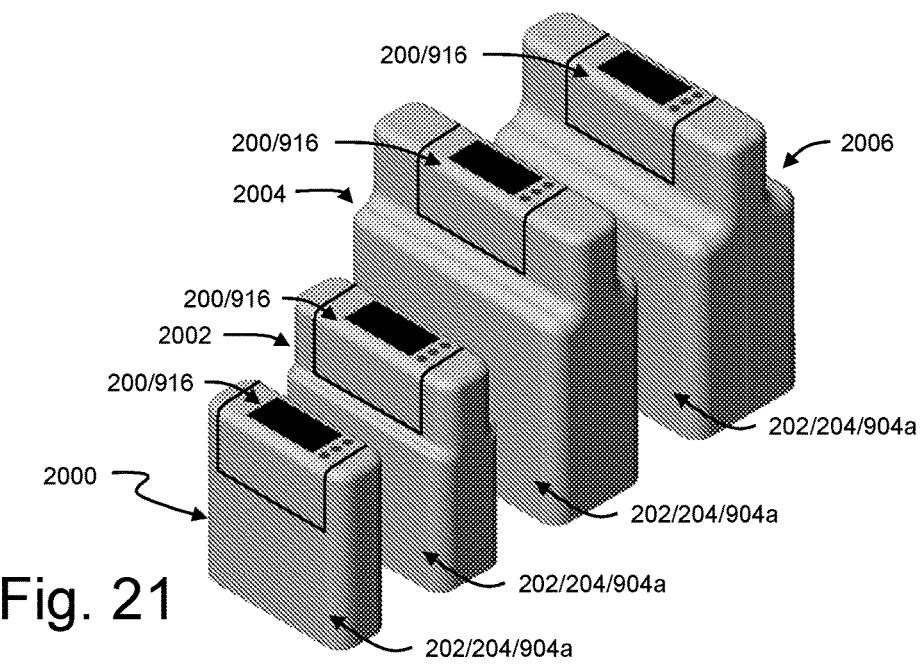

FIGS. 20A-B and FIG. 21 further illustrate module 200 with the user interface being used with various capacity and physical sized modules 202 for various modalities and user scenarios. In these embodiments, system 2000 shows a relatively small lightweight portable 1 liter-per-minute (LPM) configuration. System 2002 shows a slightly larger but still relatively small and lightweight portable 2 LPM configuration. System 2004 shows a slightly larger but still relatively small and lightweight transportable 3 LPM configuration. And, system 2006 shows a slightly larger but still relatively small and lightweight stationary 3 LPM configuration. The aforementioned flow capacities are exemplary and other flows can also be provided such as, for example, up to 5 LPM or more.

FIGS. 18-21 thus illustrate various embodiments where module 200 having the user interface for controlling the overall system is usable with various size capacity modules 202. In this manner, a user that is already familiar with the user interface in module 200 does not have to relearn a different user interface as system capacity is increased (or decreased) via use of modules 202.

Figure 22A:
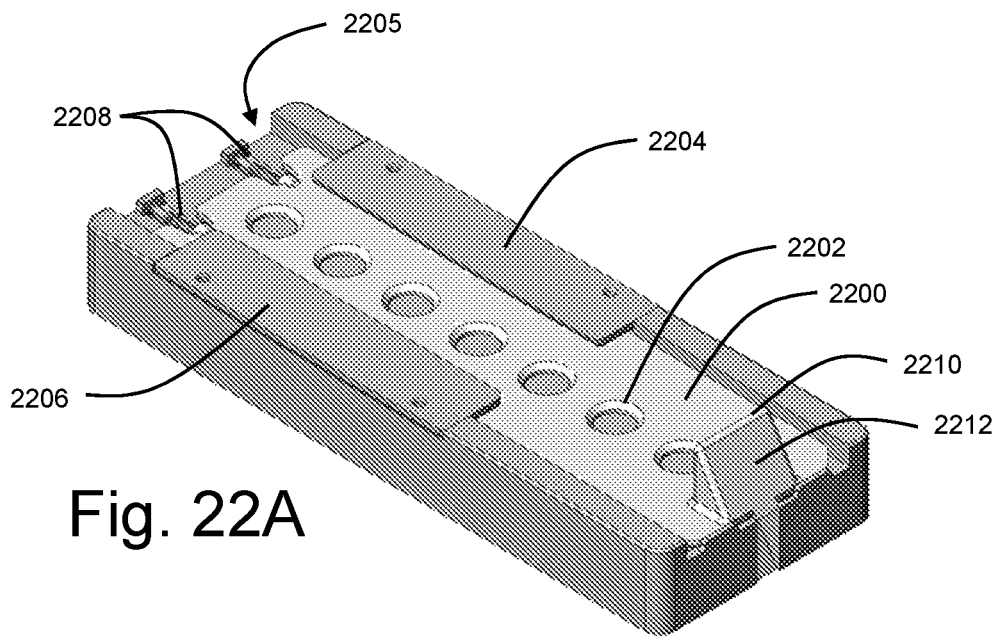
FIG. 22 illustrates one embodiment of a protective cover assembly for pneumatic and/or electrical ports of the disclosed embodiments.
Figure 22B:
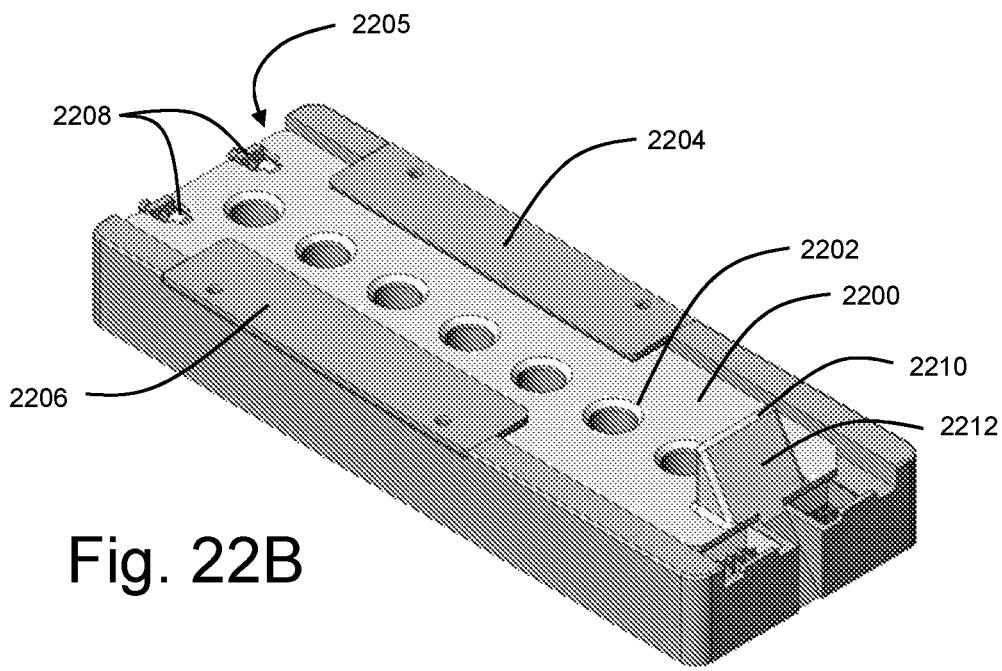

The ports illustrated in FIGS. 11F-G are one example of pneumatic ports 112 (and 912) implementable on modules 202 in the embodiments of FIGS. 18-21. By way of further example, FIGS. 22A-B illustrate a protective (dust) cover assembly that can also be implemented on modules where pneumatic and electrical ports are used. The assembly includes a cover 2200 having a plurality of openings 2202 and a cammed projecting member 2210. The cover 2200 is movable and retained by the module housing via recess 2205 and retaining guides 2204 and 2206. Biasing springs 2208 bias cover 2200 to a closed position where the ports are covered (i.e., openings 2202 are not above the ports, but offset therefrom to protect the ports from dust and other containments) (see FIG. 22A). When another module is to be connected (thus connecting their respective pneumatic ports), surface 2212 of cammed projecting member 2210 is used or mechanically engaged to move or slide cover 2200 so that openings 2202 align with the pneumatic ports (see FIG. 22B). Surface 2212 is angled, which provides for the camming action when a vertical mechanical force is applied to surface 2212. In this manner, the dust cover 2200 is normally closed when second module is not connected and moves to the open position allowing the pneumatic ports to connect when a second module is connected.

While the present invention has been illustrated by the description of embodiments thereof, and while the embodiments have been described in considerable detail, it is not the intention of the descriptions to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures can be made from such details without departing from the spirit or scope of the general inventive concept.

The invention claimed is:

1. A modular gas concentrating system comprising:
   at least one gas concentrating module,
      the gas concentrating module connectable and disconnectable from other gas concentrating modules; and
      the gas concentrating module comprising a housing having at least one pneumatic port for connection to at least one other gas concentrating module;
   at least one power module for powering the at least one gas concentrating module; the power module connectable and disconnectable from the gas concentrating module and other gas concentrating modules;
   the power module connectable and disconnectable from other power modules; and
   whereby the gas concentrating modules connected provide an overall output capacity of the modular gas concentrating system.

2. The system of claim 1 wherein the at least one gas concentrating module comprises a pressure or vacuum source and a gas separation assembly.

3. The system of claim 2 wherein the at least one gas concentrating module further comprises controller.

4. The system of claim 3 wherein the at least one gas concentrating module further comprises a gas valve manifold.

5. The system of claim 1 wherein the housing further comprises at least one electrical port for connection to the at least one other gas concentrating module.

6. The system of claim 1 wherein the power modules connected provide an overall power capacity.

7. The system of claim 1 wherein the housing comprises at least one guiding assembly for physically connecting the at least one gas concentrating module to another gas concentrating module.

8. The system of claim 1 wherein the housing comprises at least one locking assembly for locking and unlocking the at least one gas concentrating module to another gas concentrating module.

9. The system of claim 1 wherein the housing comprises:
at least one electrical port accessible from outside the housing;
at least one guiding assembly for connecting the at least one power module to either another power module or a gas concentrating module; and
at least one locking assembly for locking and unlocking the at least one power module to either another power module or gas concentrating module.

10. The system of claim 1 wherein the at least one gas concentrating module comprises a pressure/vacuum source.

11. The system of claim 1 wherein the at least one power module comprises a pressure/vacuum source.

12. A modular gas concentrating system comprising:
a gas separation module having one or more sieves, a first compressor, and a first power source;
a compressor module having a larger or smaller capacity compressor than the first compressor and connectable and disconnectable from the gas separation module;
at least one product gas storage for accumulating a concentrated gas generating by the gas separation module; and
the gas separation module further comprising a housing having at least one pneumatic port for connection with the compressor module.

13. The system of claim 12 wherein the compressor module comprises a second power source.

14. The system of claim 12 wherein the compressor module comprises one or more gas separation sieves.

15. A modular gas concentrating system comprising:
a gas separation module having one or more sieves;
a base module connectable and disconnectable with the gas separation module and having a first power source, a first compressor, and at least one sieve;
a compressor module connectable and disconnectable from the gas separation module and having a smaller capacity compressor than the first compressor;
a second power source for powering the compressor module; and
wherein the gas separation module comprises a housing having at least one pneumatic port for connection with the base or compressor module.

16. The system of claim 15 wherein the housing comprises at least one electronic port for connection with the base or compressor module.

17. The system of claim 15 further comprising a controller to cause the system to generate a pulsed output of concentrated gas when the compressor module is connected to the gas separation module and a continuous output of concentrated gas when the base module is connected to the gas separation module.

18. A gas concentrating system comprising:
a first module having a housing that includes a user interface,
a second module having a housing that includes a gas concentrating system having at least one sieve bed and a pump, and
wherein the first module's housing is connected to the second module's housing allowing the user interface to control the second module; and
wherein the first module's housing comprises at least one pneumatic port for connection to the second module.

19. A modular gas concentrating system comprising:
a gas separation module comprising a housing having one or more sieves, a first compressor, and a first power source;
a base module connectable and disconnectable with the gas separation module and having a second power source, a second compressor, and one or more sieves; and
wherein the gas separation module housing comprises at least one pneumatic port for connection with the base module.

20. The system of claim 19 wherein the base module comprises a housing and at least one pneumatic port for connection with the gas separation module.

* * * * *